(12) United States Patent
Ye et al.

(10) Patent No.: US 11,010,355 B2
(45) Date of Patent: May 18, 2021

(54) LAYER-BASED FILE ACCESS METHOD AND APPARATUS OF VIRTUALIZATION INSTANCE

(71) Applicant: Huawei Technologies Co., Ltd., Shenzhen (CN)

(72) Inventors: Lei Ye, Shenzhen (CN); Qixuan Wu, Shenzhen (CN); Lei Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 202 days.

(21) Appl. No.: 16/371,503

(22) Filed: Apr. 1, 2019

(65) Prior Publication Data

US 2019/0227995 A1 Jul. 25, 2019

Related U.S. Application Data

(63) Continuation of application No. PCT/CN2017/104409, filed on Sep. 29, 2017.

(30) Foreign Application Priority Data

Sep. 30, 2016 (CN) .......................... 201610874195.1

(51) Int. Cl.
*G06F 16/188* (2019.01)
*G06F 16/00* (2019.01)
(Continued)

(52) U.S. Cl.
CPC ........ *G06F 16/188* (2019.01); *G06F 9/45558* (2013.01); *G06F 16/00* (2019.01); *G06F 16/176* (2019.01); *G06F 2009/45583* (2013.01)

(58) Field of Classification Search
CPC ...... G06F 16/188; G06F 16/00; G06F 16/176; G06F 9/45558; G06F 2009/45583
(Continued)

(56) References Cited

U.S. PATENT DOCUMENTS 7,293,033 B1 11/2007 Tormasov et al.
8,392,623 B2 * 3/2013 Subramanian ...... G06F 9/45558
710/5
(Continued)

FOREIGN PATENT DOCUMENTS

CN 1688981 A 10/2005
CN 104021063 A 9/2014
(Continued)

OTHER PUBLICATIONS

Ben-Yehuda, Muli, et al., "The Turtles Project: Design and Implementation of Nested Virtualization", © Jan. 2010, 15 pages.*
(Continued)

*Primary Examiner* — Robert Stevens
(74) *Attorney, Agent, or Firm* — Conley Rose, P.C.

(57) ABSTRACT

The present disclosure discloses a file access method of a virtualization instance, including performing union on some image subfiles in a host operating system (host OS) and mounting a united directory to a union directory, and when an application in a library operating system instance needs to access a file in the union directory, causing a central processing unit to generate an exit event such that a hypervisor captures and processes the exit event, and during processing, converts an access request that is from the instance into an access request based on a system call of the host OS, and performs access.

18 Claims, 16 Drawing Sheets

(51) Int. Cl.
*G06F 16/176* (2019.01)
*G06F 9/455* (2018.01)
(58) Field of Classification Search
USPC .......................................................... 707/831
See application file for complete search history.

(56) References Cited

U.S. PATENT DOCUMENTS

| | | | |
|---|---|---|---|
| 8,904,386 B2 | 12/2014 | Cai et al. | |
| 9,075,638 B2 | 7/2015 | Barnett et al. | |
| 9,792,131 B1* | 10/2017 | Uchronski | G06F 9/455 |
| 2006/0242179 A1 | 10/2006 | Chen et al. | |
| 2010/0146620 A1 | 6/2010 | Simeral et al. | |
| 2011/0119669 A1 | 5/2011 | McRae | |
| 2012/0227061 A1 | 9/2012 | Hunt et al. | |
| 2012/0254885 A1 | 10/2012 | Cai et al. | |
| 2014/0053150 A1 | 2/2014 | Barnett et al. | |
| 2017/0235764 A1* | 8/2017 | Sharpe | G06F 3/0664 707/827 |

FOREIGN PATENT DOCUMENTS

| | | |
|---|---|---|
| CN | 105740044 A | 7/2016 |
| KR | 20100066405 A | 6/2010 |

OTHER PUBLICATIONS

No, Jaechun, et al., "MultiCache: Multilayered Cache Implementation for I/O Virtualization", Scientific Programming, vol. 2016, Article ID 3780163, Hindawi Publishing Corp., © 2016, pp. 1-13.*
Machine Translation and Abstract of Chinese Publication No. CN105740044, Jul. 6, 2016, 12 pages.
Shi, X., et al. "Applying Protected Decentralizing Abstractions to Build Extensible Operating Systems, Microelectronics and Computer," Feb. 2003, 6 pages. With English abstract.
Long, C., et al. "Design and implementation of a real-time libOS based on Barrelfish," Microcomputer and Its Applications, Example of Application, Feb. 2013, 3 pages. With English abstract.
Foreign Communication From a Counterpart Application, PCT Application No. PCT/CN2017/104409, English Translation of International Search Report dated Jan. 4, 2018, 2 pages.
Foreign Communication From a Counterpart Application, PCT Application No. PCT/CN2017/104409, English Translation of Written Opinion dated Jan. 4, 2018, 4 pages.
Foreign Communication From a Counterpart Application, European Application No. 17854995.2, Extended European Search Report dated Jun. 17, 2019, 9 pages.

* cited by examiner

LAYER-BASED FILE ACCESS METHOD AND APPARATUS OF VIRTUALIZATION INSTANCE

CROSS-REFERENCE TO RELATED APPLICATIONS

This application is a continuation of International Patent Application No. PCT/CN2017/104409, filed on Sep. 29, 2017, which claims priority to Chinese Patent Application No. 201610874195.1, filed on Sep. 30, 2016, The disclosures of the aforementioned applications are hereby incorporated by reference in their entireties.

TECHNICAL FIELD

The present disclosure relates to the field of software technologies, and in particular, to a layer-based file access method and apparatus of a virtualization instance.

BACKGROUND

A library operating system (LibOS) is a lightweight operating system (OS). A portable operating system interface (POSIX) of a LibOS-based application is provided by a runtime library in the LibOS, not by a host OS (such as Linux or other conventional operating systems), that is, the LibOS implements and manages a POSIX function. Some common implementation technologies of the LibOS include $OS^v$ (http://Osv.io), MIRAGE (https://mirage.io/), GRAPHENE (http://graphene.cs.stonybrook.edu/), and the like.

FIG. 1 is a diagram of an example application based on a library operating system. A library operating system and an application constitute a library operating system instance. The instance runs on top of a host OS. A hypervisor, a library operating system engine, and other modules may run on the host OS. The library operating system engine is configured to run the library operating system instance.

Each library operating system instance manages its own file and does not share the file with other instances. When there are a plurality of instances, storage space is wasted because some identical files exist between the instances.

SUMMARY

Embodiments of the present disclosure provide a layer-based file access method of a virtualization instance, to resolve a prior-art problem that more storage space is occupied when a plurality of instances run.

According to a first aspect, an embodiment of the present disclosure provides a layer-based file access method of a virtualization instance, used for accessing a file in a host OS (Host OS), where a hypervisor (Hypervisor) and a library operating system engine (LibOS Engine) run on the host OS, and the host OS, the hypervisor, and the library operating system engine run in a host (Host) mode, and the method includes obtaining, by the library operating system engine, an image file of a library operating system instance based on a library operating system (LibOS), where the image file includes a plurality of image subfiles, and the plurality of image subfiles are specified as one or more image layers, and obtaining the plurality of image subfiles from the image file, and storing, according to the one or more image layers specified by the plurality of image subfiles, the plurality of image subfiles to a plurality of image subfile directories that are in the host OS and that are in a one-to-one correspondence to the one or more image layers, performing first union on all the image subfile directories and mounting a united directory to a first union directory, using a union file system, where the first union directory includes at least one union directory file, and one or more union layers formed by the at least one union directory file based on the first union are in a one-to-one correspondence to the one or more image layers, and as the name suggests, the union directory file is a file in the first union directory, and the union layer is a "layer" based on the union file system, running, in a guest (Guest) mode based on one or more of the plurality of image subfiles by the library operating system engine, the library operating system instance, and when an application in the library operating system instance needs to access the union directory file, after the library operating system (LibOS) receives a first access request from the application, making a central processing unit generate an exit event of switching from the guest mode to the host mode such that the hypervisor captures the exit event, performs processing to convert the first access request into a second access request that can be used to access, in the host mode based on a host OS call, an image subfile corresponding to the union directory file, and accesses, based on the second access request, the image subfile corresponding to the union directory file.

The host OS may run the hypervisor and the library operating system engine in a kernel mode or a user mode, or may run one of them in a kernel and the other one in a user mode.

In this embodiment, the running, by the library operating system engine, the library operating system instance is starting, by the library operating system engine, the instance and making the instance run. An order of performing this step and the previous step (union and mounting) is not limited. This step may be performed before or after the previous step, or may be performed at the same time as the previous step, provided that the two steps are completed before the next step (the application accesses the union directory file).

In this embodiment, the host mode and the guest mode are two processor running modes, that is, two running modes designed for a processor for security reasons. A program running in the guest mode usually has lower permission than a program running in the host mode, and the program running in the guest mode cannot directly access a resource running in the host mode, while the program running in the host mode can directly access a resource running in the guest mode. Based on different processors, the host mode and the guest mode have different names. For example, for an x86 architecture-based processor, a host mode is also referred to as a root mode (root mode), and a guest mode is also referred to as a non-root mode (non-root mode). For another example, for an Advanced Reduced Instruction Set Computer Machine (ARM) 64 architecture-based processor, a host mode is a processor running mode in which a host OS runs, and includes two running modes, EL2 (for a kernel) and EL0 (for a user), and a guest mode is a processor mode in which a guest operating system runs, and includes two running modes, EL0 (for a kernel) and EL0 (for a user). In addition, it should be noted that in an ARM64 architecture-based processor, the library operating system instance in this solution may run only in the EL1 running mode. A person skilled in the art can understand the meanings of the host mode and the guest mode for different processors according to the foregoing definitions and descriptions.

When a processor running mode switches from a guest mode to a host mode, this process is referred to as "exit". When a processor running mode switches from a host mode to a guest mode, this process is referred to as "enter". The exit event in this embodiment is an event indicating a (virtual machine) vm exit process.

In this embodiment, "first" in "first union" (and "second" in "second union" below) is used only for distinguishing from a "union" action performed in another step, but not for indicating a special meaning.

In this embodiment, the "first access request" is an access request sent to the library operating system by the application, and the request is used to access the union directory file. It should be noted that in some cases, some processing (for example, conversion by various file systems, some mapping, or some mounting) may be performed on the union directory file when the union directory file is aware by the application (that is, the union directory file is seen by the application using an interface of the application), and therefore, a name of the union directory file aware by the application is different from a name of a real union directory file (for example, a file name of a union directory file is a.txt, and after processing is performed on the union directory file, a name of a file aware by an application is b.txt), but essentially, the two union directory files access same data in hardware (that is, when the application accesses b.txt, a.txt is accessed after processing is performed on b.txt, and data in hardware corresponding to a.txt is finally accessed). Therefore, in the embodiments of the present disclosure, a parameter (such as a file name), used for indicating access to the union directory file, in the first access request is not limited to be strictly the same as a file name of the union directory file, provided that the union directory file can be finally accessed using the first access request.

In this embodiment, the union file system is introduced to perform union on an image subfile in the host OS, and the exit event is generated such that an application in the guest mode can access an image subfile in the host OS running in the host mode. In this way, all the image subfile directories are united by the union file system, and the application running in the guest mode can access the image subfile in the host OS running in the host mode such that each instance can access the image subfile in the host OS, the image subfile in the host OS is shared by each instance, and each instance does not need to store a duplicate (or possessed) file. This saves storage space of each library operating system instance.

In addition, after the union file system is used, each library operating system instance can see all files (depending on a characteristic of the union file system) in a directory (the first union directory). In this way, an application developer can put aside a real file address but uses a directory address. This greatly facilitates application development for the developer.

In addition, in this embodiment, the first access request is converted into the second access request by capturing the exit event. This manner does not require many procedures (for example, a procedure of invoking some common file systems such as ext3), and achieves higher execution efficiency and a faster speed.

Based on the first aspect, in a first implementation of the first aspect, the first union directory is in the library operating system, and the step of performing first union on all the image subfile directories and mounting a united directory to a first union directory, using a union file system in the first aspect may include mounting, by the library operating system engine, the plurality of image subfile directories to one or more mount directories in the library operating system, and performing, by the library operating system, the first union on the one or more mount directories and at least one common file system-based readable/writable directory in the library operating system and mounting a united directory to the first union directory, using a union file system contained in the library operating system, where a property of the at least one readable/writable directory is readable/writable in the union file system.

In this implementation, the image subfile directories are also united with a readable/writable directory in the LibOS. The image subfile directories are united with a readable/writable directory such that the LibOS instance can have space for its private data. In addition, the readable/writable directory is placed in the LibOS instead of the host OS, and therefore, cannot be accessed by another LibOS instance. This is more secure. It should be noted that in this implementation and other various implementations, if mounting of one or more readable/writable directories is required, compared with a directory mounted in a read-only manner (for example, the image subfile directory), these directories are usually located above the directory mounted in the read-only manner. In addition, the readable/writable directory is in the LibOS, and therefore, an application in the LibOS does not need to access the readable/writable directory from the host OS. This improves access efficiency.

In addition, if an instance migration operation (that is, stopping an instance and running the instance on another host) needs to be performed, a snapshot may be created for a readable/writable directory, and the snapshot is copied to another instance. This is easy to implement, and simplifies a migration operation.

Moreover, because the union operation is performed only once (union is performed only in the LibOS once), no excessive converting operations are required when a file in the host OS is accessed from a LibOS instance. This achieves high efficiency.

Based on the first aspect, in a second implementation of the first aspect, the first union directory is in the library operating system, and the step of performing first union on all the image subfile directories and mounting a united directory to a first union directory, using a union file system in the first aspect may include mounting, by the library operating system engine, the plurality of image subfile directories to one or more mount directories in the library operating system, and performing, by the library operating system, the first union on the one or more mount directories and mounting a united directory to the first union directory, using a union file system contained in the library operating system.

In this implementation, the first union is performed in the library operating system such that the easy-to-migrate effect described in the first implementation is also achieved.

Based on the first aspect, in a third implementation of the first aspect, the first union directory is in the host OS, and the step of performing first union on all the image subfile directories and mounting a united directory to a first union directory, using a union file system in the first aspect may include performing, by the library operating system engine, the first union on all the image subfile directories and mounting the united directory to the first union directory, by invoking a union file system in the host OS.

The first union directory is placed in the host OS such that the first union directory is visible to another library operating system instance, facilitating use for the another instance (for example, the another instance may perform, based on the first union directory, union on some directories).

Based on the third implementation of the first aspect, in a fourth implementation of the first aspect, the method further includes mounting, by the library operating system engine, the first union directory to a mount directory in the library operating system instance, and performing, by the library operating system, second union on the mount directory and at least one readable/writable directory in the library operating system and mounting a united directory to a second union directory, by invoking a union file system contained in the library operating system, where a property of the at least one readable/writable directory is readable/writable in the union file system in the library operating system.

In this implementation, in addition to the union performed in the host OS, union with a readable/writable directory is performed in the LibOS.

Two union operations are performed, and a result obtained from the first union operation is shielded in the LibOS by a result obtained from the second union operation. Therefore, to access a union directory file in the first union directory, the second union directory is first accessed, then, a customized file system is invoked to generate an exit event, and finally, the union directory file is accessed.

In this embodiment, because union with a readable/writable directory is performed in the LibOS, advantages similar to those mentioned in the first implementation of the first aspect, including higher security and ease of migration, are also achieved.

Based on the first implementation of the first aspect or the fourth implementation of the first aspect, in a fifth implementation of the first aspect, the method further includes when the library operating system receives a third access request used for accessing a file in the readable/writable directory, accessing, based on a common file system in the library operating system, the file in the readable/writable directory.

Based on the first aspect or various implementations of the first aspect, in a sixth implementation of the first aspect, the making a central processing unit generate an exit event of switching from the guest mode to the host mode may include making, by invoking a customized file system in the library operating system to access the union directory file, the central processing unit generate the exit event, where the customized file system is a file system that is capable of making, according to the first access request, the central processing unit generate the exit event. The customized file system has a file system function, that is, being capable of managing a file like various common file systems. In addition, the customized file system is capable of generating an exit event according to the first access request. The customized file system may invoke, according to an instruction corresponding to the first access request, a vm exit instruction that enables the central processing unit to generate the exit event. For example, in an x86 architecture-based processor, a vmcall instruction may be invoked to trigger a vm exit.

In the fifth and sixth implementations, the library operating system may include three file systems a customized file system, a common file system, and a union file system. The common file system is used to manage a readable/writable directory, and may be various frequently-used file systems (such as THIRD EXTENDED FILE SYSTEM (ext3), temporary file storage facility (tmpfs), and random access memory disc (ramdisk)). Preferably, a memory-based file system (such as tmpfs) may be used to perform management such that a memory of the file system can be accessed directly, and efficiency is higher. The union file system is used to perform union. This function is the same as a function of an existing union file system, and details are not described herein. The customized file system is a file system that has a function of a common file system and that is capable of generating an exit event. The customized file system is used to manage a mount directory used to mount an image subfile directory that is from a host OS. For example, the mount directory used to mount the image subfile directory mentioned in the foregoing various implementations may be managed based on the customized file system.

In the LibOS, a union file system may be considered as a file system at a top layer, and a customized file system and a common file system may be considered as two parallel file systems below the union file system. In the foregoing implementations in which union with one or more readable/writable directories is required, after receiving a user request, the union file system in the LibOS determines whether an access request is a first access request or a third access request, and invokes, based on a determining result, a customized file system (for the first access request) or a common file system (based on the third access request) to perform processing. When the customized file system is invoked, an exit event may be generated such that a hypervisor can capture the exit event and perform subsequent processing.

Based on the first aspect, in a seventh implementation of the first aspect, the first union directory is in the host OS, and the step of performing first union on all the image subfile directories and mounting a united directory to a first union directory, using a union file system in the first aspect may include performing, by the library operating system engine, the first union on the plurality of image subfile directories and at least one readable/writable directory in the host OS and mounting a united directory to the first union directory, using a union file system in the host OS, where a property of the at least one readable/writable directory is readable/writable during the first union, and the method further includes mounting, by the library operating system engine, the first union directory to a mount directory in the library operating system, and correspondingly, when the application in the library operating system instance needs to access the union directory file, accessing the union directory file through the mount directory.

In this implementation, the readable/writable directory and the image subfile directories are united in the host OS. In this way, when a failure occurs in an instance, because data is still kept in the host OS, the instance can be recovered conveniently based on the data in the host OS. This improves system reliability.

Based on the first aspect or various implementations of the first aspect, in an eighth implementation of the first aspect, a property of the image subfile directory is read-only during the first union (that is, a property of the image subfile directory is read-only in the first union directory). If two or more union operations are required, a property of the image subfile directory may also be read-only in a union file system subsequently. In this way, original data cannot be modified by instances, and security of the original data is improved while sharing is implemented. In the foregoing implementations in which union with one or more readable/writable directories is required, a property of the readable/writable directory is readable/writable during the union such that the union file system can modify the readable/writable directory. An original property of an image subfile is not limited. An original property of the readable/writable directory needs to be correspondingly set to readable/writable because the readable/writable directory needs to be read or written.

Based on the first aspect or various implementations of the first aspect, in a ninth implementation of the first aspect, the exit event is generated when the library operating system invokes a hypercall instruction (for example, the vmcall instruction described above), or is generated when the library operating system constructs an exception. A method for constructing an exception may be as follows. An exception is generated using an instruction (carrying some parameters used for accessing a union directory file) used to access an invalid address in a LibOS. After capturing the exception subsequently, the hypervisor extracts the parameters contained in the instruction for processing. Alternatively, for example, in an x86 architecture-based processor, an exception may be constructed by invoking a wrmsr instruction. Alternatively, other manners for constructing an exception may be used. This is not limited in the present disclosure.

The hypercall instruction and a manner for constructing an exception are provided by each system. Therefore, the exit event can be implemented easily and efficiently in an existing manner used by the system, without complex procedures.

Based on the first aspect or various implementations of the first aspect, in another implementation, the LibOS may further include one or more non-union readable/writable directories that are managed using a common file system (the prefix non-union means that the readable/writable directories are not united with another file), and an application in the LibOS accesses these readable/writable directories using the common file system.

In some application scenarios, union with some readable/writable directories may not be required, and the readable/writable directories need to be used only in the LibOS, therefore, a union file system may not be used to manage these directories independently. In addition, these directories are set in the LibOS such that an application does not need to perform access in the host OS. This can improve efficiency.

Based on the seventh implementation of the first aspect, different file systems may be designed in the LibOS to access a file in the host OS.

In another implementation, the LibOS includes a customized file system. The customized file system provides a customized file access interface to an application, and after an access request from the application is received, does not invoke a system call but directly invokes an instruction that can be used to generate an exit event. When access is performed in this manner, an access path is shorter (that is, a system call is not required).

In another implementation, the LibOS includes a common file system and a system call capturing module. When content in a directory to which mounting is performed based on the common file system is accessed using the common file system, a system call is invoked. In this case, the system call capturing module is configured to capture the system call and generate an exit event. When access is performed in this manner, a common file access interface may be used, without a need of customizing a file access interface. This facilitates application development for a developer.

Based on the first aspect, in another implementation, the first union directory is set in the host OS and is mounted to the LibOS (mounted to a mount directory managed by a common file system in the LibOS). The LibOS further includes one or more readable/writable directories managed using the common file system, and the one or more readable/writable directories are not united with a mounted-to directory. When an image subfile in the host OS needs to be modified, the file is obtained, copied to a readable/writable directory, and then modified. If the file needs to be modified again subsequently, modification is made to the file stored in the readable/writable directory. In this implementation, for a method for accessing content in the union file system by an application in the LibOS, refer to the methods in the foregoing various implementations, for example, a manner of using a customized file access interface, or a manner of using a common file access interface and a system call capturing module.

According to a second aspect, an embodiment of the present disclosure discloses an electronic device capable of implementing layer-based file access for a virtualization instance, where the electronic device is configured to access a file in a host OS, and includes a hypervisor, a library operating system engine, and a library operating system, the hypervisor and the library operating system engine run on the host OS, and the host OS, the hypervisor, and the library operating system engine run in a host mode. For functions performed by the hypervisor and the library operating system engine, refer to functions described in the first aspect or various implementations of the first aspect.

According to a third aspect, an embodiment of the present disclosure discloses an electronic device capable of implementing layer-based file access for a virtualization instance, where the electronic device includes a central processing unit (CPU) and a storage, the CPU is configured to read and execute code stored in the storage, and the code stored in the storage may include code of modules mentioned in the second aspect, such as the hypervisor and the library operating system engine.

According to a fourth aspect, an embodiment of the present disclosure discloses a storage medium, where the storage medium is configured to store code of modules mentioned in the second aspect such as the hypervisor and the library operating system engine, or may store code of a host OS and modules such as the hypervisor and the library operating system engine to perform the following operations. Entering a user mode of the host OS, and downloading an image of a LibOS instance to run the LibOS instance, and performing interaction operations described in the first aspect or various implementations of the first aspect with the instance such that an application in the LibOS instance accesses, based on layers of a union file system, a file in the host OS.

DESCRIPTION OF EMBODIMENTS

The following describes this application in detail with reference to accompanying drawings. To make content in the embodiments of the present disclosure more understandable to a person skilled in the art, the following first describes application scenarios of the embodiments and various types of background knowledge.

Figure 1:
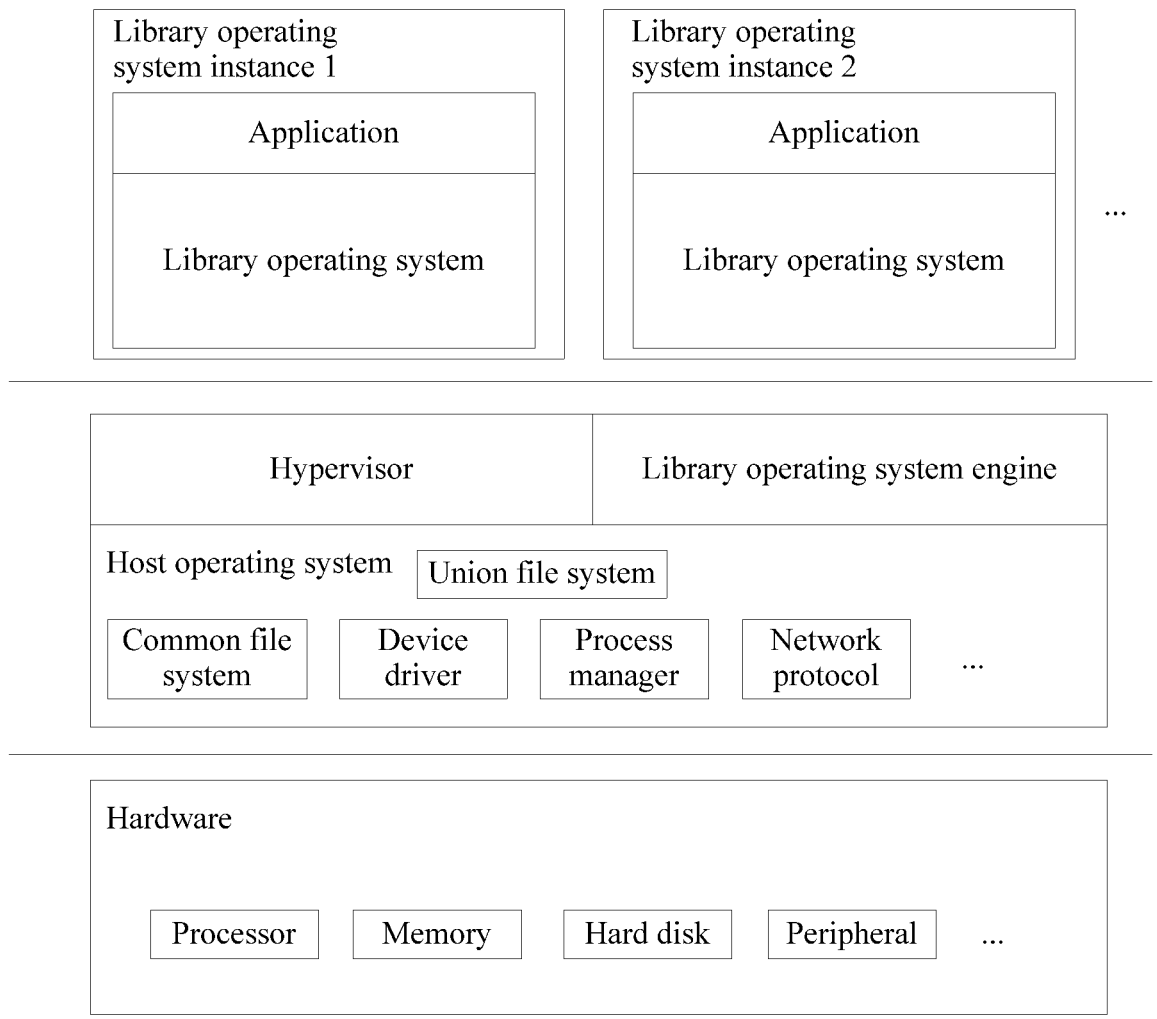
FIG. 1 is a schematic diagram of a system architecture based on a library operating system.

Referring to FIG. 1, shown is a schematic diagram of a software and hardware architecture of a device (which may be referred to as a host) on which the following embodiments are based. Hardware may be an existing hardware device, usually including a processor, a memory, a storage device (such as a hard disk), and various peripherals (such as a keyboard and a mouse). When the device operates, the processor reads, from the storage device, code required for system running, loads the code into the memory, and executes a corresponding program according to the code loaded into the memory. Some data is generated during program execution. The data may be stored in the memory or a hard disk according to a requirement.

Software includes a host OS. The prefix "host" is used only for distinguishing between terms below including "operating system" (for example, a library operating system below), but does not indicate another special meaning. The host OS may be any existing mainstream operating system such as a LINUX operating system. Various software modules that can run in the host OS may include, for example, a device driver, a process manager, a network protocol, a common file system, a union file system, and various pre-installed applications.

"Common" in the "common file system" is used for being distinguished from "union" in the "union file system". The common file system is a file system commonly understood by a person skilled in the art, for example, a file system frequently-used in a Windows system such as file allocation table (FAT)32 or new technology file system (NTFS), and a file system frequently-used in a LINUX system such as ext2 or ext3.

A union file system (also referred to herein as UNIONFS) is a file system capable of performing union mount to another file system (such as a common file system), and may be used as a part of a kernel or exist in a host OS in an application (user mode) form. The union file system allows directories in other file systems to be union-overlaid by layer. From the perspective of an upper-layer application, all content (including directories and files) in the directories is in a same directory. A common union file system may be an ADVANCED UNIONFS (AUFS) (official website: http://aufs.sourceforge.net/). To better explain functions of the union file system, a simple example of using an AUFS is provided herein.

As shown below, it is assumed that two files, a fruits directory and a vegetables directory, are created based on a common file system, and the fruits directory includes an apple file and a tomato file, and the vegetables directory includes a carrots file and a tomato file.

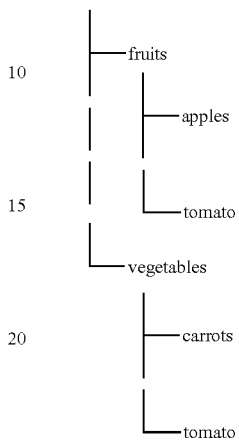

Then, run the following command to create a mount directory (whose directory name is mnt):

$ mkdir mnt

Run the following command to perform union on the fruits directory and the vegetables directory and mount a united directory to the directory ./mnt:

$ sudo mount -t aufs -o dirs=./fruits:./vegetables none ./mnt

Run the following command to display the directory ./mnt:

$ tree ./mnt

The following content is displayed.

./mnt

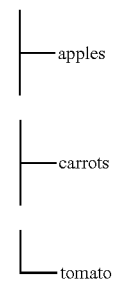

It can be seen that the apple file, the carrots file, and the tomato file are in the directory ./mnt, that is, content in both the fruits directory and the vegetables directory are added to the directory ./mnt through union.

The foregoing example is merely a simple application of the union file system.

The "mounting" operation in the foregoing descriptions is also a technology known to a person skilled in the art. For example, in a LINUX operating system, mounting means mounting a device to a directory that already exists (for example, mounting using a mount command). To access a file in a storage device, a partition in which the file is located may be mounted to a directory that already exists, and then, the storage device is accessed by accessing the directory.

The software in FIG. 1 further includes a hypervisor. The hypervisor is mainly used to virtualize some hardware resources (such as a hardware machine) to provide corresponding interfaces for upper-layer software to use, for example, for a library operating system described later to use. The hypervisor may run in a kernel of a host OS, or run in a host OS user mode in an application form. Alternatively, a part of the hypervisor is in a kernel, and a part of the hypervisor is on top of an operating system.

A library operating system engine (LibOS Engine) is some supporting software modules of the library operating system that are configured to manage a library operating system instance based on the library operating system. Functions of the library operating system engine are described in detail in the following embodiments. The library operating system engine may also run in a kernel or in a user mode, but for security reasons, the library operating system engine usually runs in the user mode.

In the following embodiments, a LibOS and an application are collectively referred to as a LibOS instance. An entire library operating system instance is usually installed based on an image file for running.

The library operating system (or the library operating system instance) supports a plurality of functions, for example, providing a library file, a union file system, and a common file system, performing various operations, and interacting with another module. For ease of description, not all of these functions are named in the embodiments. A person skilled in the art can know that there is surely a corresponding function when a step is performed. In addition, it can be understood that a person skilled in the art can know that a description such as "a LibOS (or a LibOS instance) invokes a union file system in the LibOS (or the LibOS instance)" means a module in the LibOS (or the LibOS instance) that is independent of the union file system invokes the union file system module.

Based on the foregoing descriptions, the following further describes this application in detail with reference to embodiments and related accompanying drawings.

Embodiment 1

An image file for a LibOS instance needs to be prepared before the LibOS instance runs. In this embodiment and all other embodiments, that is, a package file of some files required for running the LibOS instance. Usually, the file may be compressed to reduce a size. For example, in a LINUX operating system, files may be packed using a tar program and compressed using various compression algorithms. The image file includes various files required by the LibOS instance, such as a runtime library and a configuration file. Various functions, for example, functions of various file systems (such as a common file system, a union file system, and a customized file system) and a software function of interacting with a LibOS engine, a hypervisor, or another module, can be implemented using the runtime library. The image file may be stored in a local storage device or a remote storage device. This is not limited herein.

All files in the image file (that is, image subfiles) are logically divided into (or "specified as") one or more layers. The "layer" herein is a term for a union file system. In the union file system (for example, an AUFS, advanced multi-layered unification filesystem), performing union may be performing union on different directories and mounting a united directory, and after union and mounting are completed, files in the directories are logically overlaid based on an "image layer" ("layer" for short). To reflect the concept of "layer", a layer may be configured using a configuration file during implementation (for example, files and layers at which the files are located are specified in a configuration file, and during subsequent union, files at a same layer may be placed in a particular directory according to the configuration file, and union is performed based on the directory), or a layer may be reflected as a directory in an image file (for example, files at different layers are placed in different directories, and during subsequent union, union is performed on these directories). Details of the implementation and application of the union file system and how to specify all files in the image file as one or more layers are not described herein.

Figure 2:
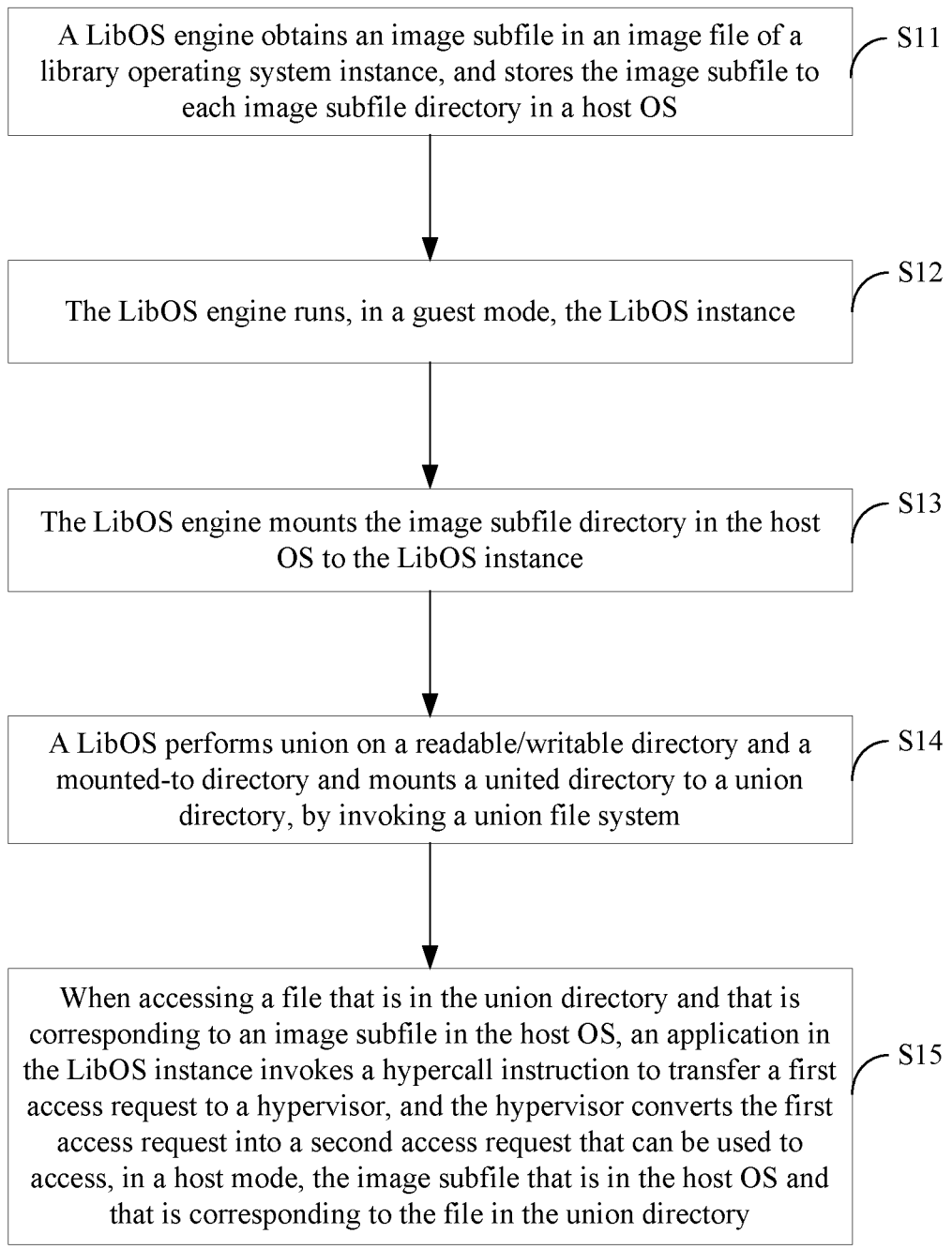
FIG. 2 is a flowchart according to Embodiment 1 of the present disclosure.

After the image file is ready, a layer-based file access method of a virtualization instance in this embodiment can be performed. Referring to a flowchart shown in FIG. 2, a schematic diagram of an example shown in FIG. 3, and a schematic diagram of accessing a file by an application shown in FIG. 4, the method includes the following steps.

Step S11. A LibOS engine obtains an image subfile in an image file of a library operating system instance, and stores the image subfile to each image subfile directory in a host OS.

After receiving an instruction (for example, input by a user using an input device or sent by some other software modules) for running a LibOS instance, the LibOS engine obtains a stored image file from a local or remote storage device. The image file is usually compressed. The LibOS engine obtains all image subfiles after decompressing the image file, and stores these image subfiles to each directory (herein referred to as an image subfile directory) in the host OS. It should be noted that in this application, unless otherwise specified, a prefix used for describing a "directory" is a name only for conveniently explaining a function of the directory, not for indicating another special meaning. For example, the "image subfile directory" herein is a "directory used for storing an image subfile", and a "union directory" below is a "directory to which united directories are mounted".

It is assumed that an image file img includes two directories: /sys and /doc, where the directory /sys includes two files: a.bin and b.so (that is, image subfiles), the directory /doc includes two files: b.so and c.txt (that is, image subfiles), and there are two layers logically, and the files in the directory /sys are at one layer, and the files in the directory /doc are at the other layer.

It is assumed that after being decompressed, the image subfiles are placed in a directory /img in the host OS. In this case, the directory includes the following files.

/img/sys/a.bin
/img/sys/b.so
/img/doc/b.so
/img/doc/c.txt

/img/sys and /img/doc are image subfile directories, and files contained in the image subfile directories are image subfiles.

It should be noted that the foregoing examples are some simple examples provided to make the solution more understandable, and these examples are merely used to illustrate the basic principle of this embodiment, and do not represent an actual case. In reality, more files and layers may exist.

Step S12. The LibOS engine runs, in a guest mode, a LibOS instance.

For example, the LibOS engine may run, based on a.bin, the LibOS instance. In reality, more files are usually needed, for example, an application program needed to be run and various configuration files.

Step S13. The LibOS engine mounts the image subfile directory in the host OS to the LibOS instance.

After the mounting, a LibOS may or may not convert an address of a file that is from the host OS. The following describes the two cases.

1. A directory address is converted.

(1) It is assumed that the directories /img/sys and /img/doc are mounted to directories /mount1 and /mount2 in the LibOS instance, respectively. After the mounting, directories and corresponding files are as follows:

/mount1/a.bin
/mount1/b.so
/mount2/b.so
/mount2/c.txt

Figure 3:
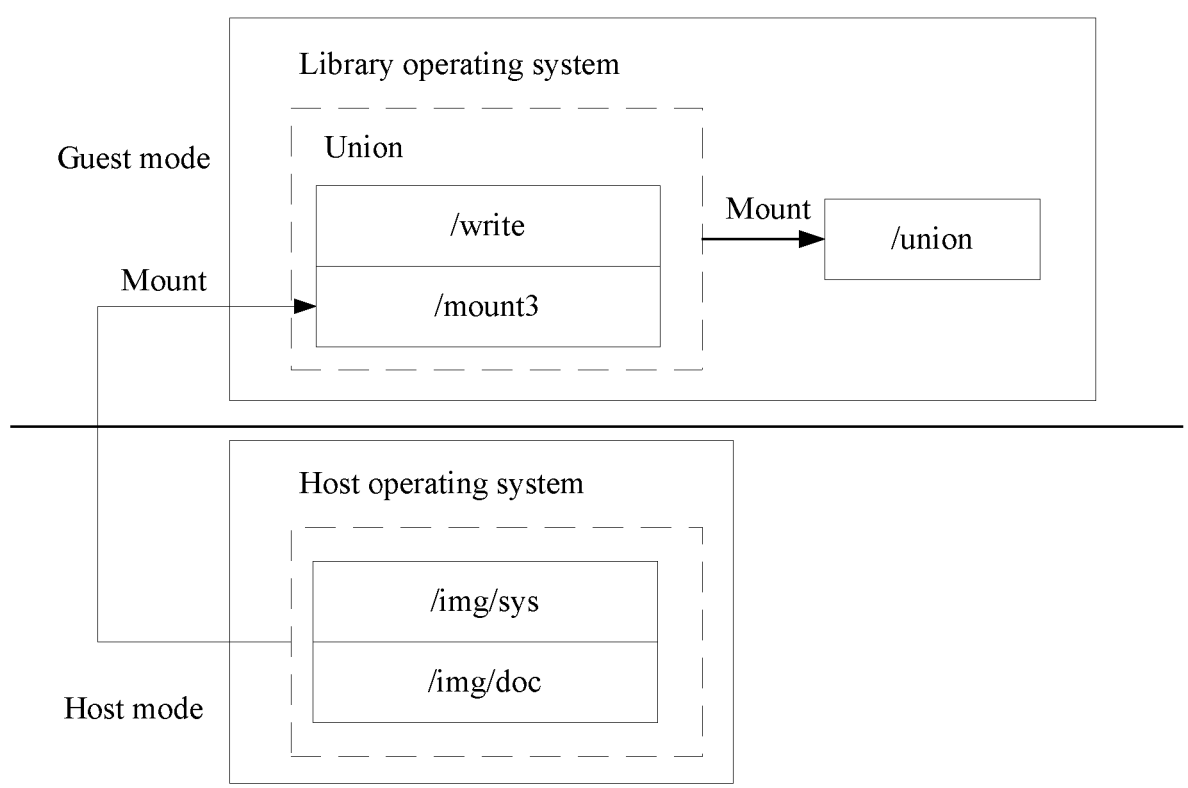
FIG. 3 is a schematic diagram of an example according to Embodiment 1 of the present disclosure.

Or, (2) The entire directory /img may be mounted to a directory in the LibOS instance. for example, a directory /mount3 (corresponding to a case shown in FIG. 3). After the mounting, directories and corresponding files are as follows:

mount3/sys/a.bin
mount3/sys/b.so
mount3/doc/b.so
mount3/doc/c.txt

The directory address conversion function is provided by a LibOS in the LibOS instance. An advantage is that an application can access a file using a shorter path, for example, a file that originally needs to be accessed using a path /mount2/img/doc/c.txt can be accessed using only a path /mount2/c.txt.

2. A directory address is not converted.

It is assumed that the sys directory and the doc directory are respectively mounted to a directory /mount4 and a directory /mount5 that are in the LibOS instance. After the mounting, directories and corresponding files are as follows:

/mount4/img/sys/a.bin
/mount4/img/sys/b.so
/mount5/img/doc/b.so
/mount5/img/doc/c.txt Step S14. A LibOS performs union on a readable/writable directory and a mounted-to directory and mounts a united directory to a union directory, by invoking a union file system.

For example, the readable/writable directory is assumed to be /write, and the mounted-to directory in S13 is assumed to be the directory obtained after the conversion in (2) of the first case. In this case, the following command can be used to perform union and mount to a union directory /union:

mount -t aufs -o dirs=/mount3:/write none /union

The readable/writable directory may be created before this step, and may contain some files. The readable/writable directory is managed based on a common file system in the LibOS, and a property of the readable/writable directory is readable/writable during creation.

A rule for union is performing union according to a pre-agreed "layer" (that is, a layer of files included in an image file). It is agreed in advance that /sys and /doc are used as two layers. /sys and /doc are mounted to the directory /mount3. Therefore, during union, /mount3, as a to-be-united source directory, is united with the readable/writable directory /write (containing, for example, a d.txt file), and a united directory is mounted to the union directory /union. In this case, the directory /union includes the following files:

/union/a.bin
/union/b.so
/union/c.txt
/union/d.txt

In addition, it may be agreed in advance that image subfile directories are united by a union file system as read-only layers. During union, an access property of the union file system for the image subfile directory is set to read-only. Correspondingly, an access property of the union file system for the readable/writable directory is set to readable/writable.

Step S15. When accessing a file that is in the union directory and that is corresponding to the image subfile in the host OS, an application in the LibOS instance transfers a first access request (that is, an access request sent to the library operating system by the application, where the request is used for accessing a file in the union directory, that is, accessing a union directory file) to a hypervisor by invoking a hypercall instruction, and the hypervisor converts the first access request into a second access request that can be used to access, in a host mode, the image subfile that is in the host OS and that is corresponding to the file in the union directory.

It should be noted that in addition to the image subfile, a file in one or more readable/writable directories in the host OS can be accessed in this manner because the one or more readable/writable directories are also in the host OS. The following describes details about accessing a file in the union directory.

Accessing a file in the union directory by an application is essentially accessing, using some intermediate layers (for example, including a union file system, a hypervisor, and the like), an image subfile that is in the host OS and that is corresponding to the file in the union directory (because the file in the union directory is obtained based on union performed on the image subfiles in the host OS).

In this embodiment, during this process, a file in a union directory is in a LibOS instance running in a guest (Guest) mode, and a file in a host OS runs in a host mode, therefore, an application in a LibOS cannot perform access directly, and needs an intermediate layer to implement some functions to perform access.

Figure 4:
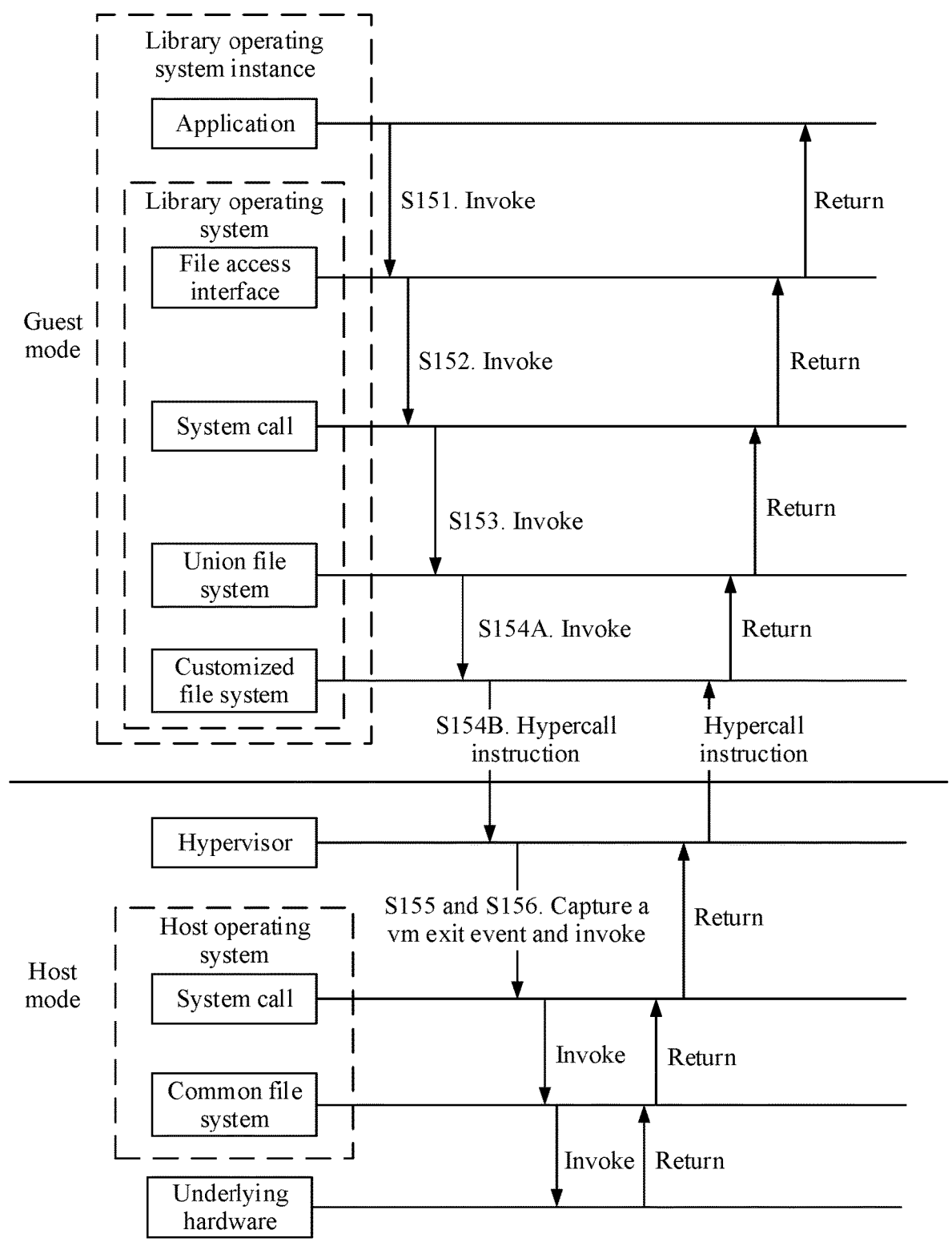
FIG. 4 is a schematic diagram of a file access method according to Embodiment 1 of the present disclosure.

Referring to FIG. 4, when an application running in a guest mode needs to access a file in a host OS running in a host mode, the following steps may be included.

Step S151. The application invokes a file access interface in a library file in a LibOS.

For example, the following pseudocode may be used to invoke the interface:

read (/mount/a.bin)

The library file is compatible with a programming language, and is a file used for providing a library function for running a program compiled using a particular programming language. In the LibOS, a plurality of library files for different programming languages may be provided, or a library file may be provided for only one of the programming languages. read in the foregoing example pseudocode is a file access interface provided by the library file.

Step S152. The file access interface invokes a system call that is in the LibOS and that is used for file access.

For example, the following pseudocode may be used to invoke the system call:

syscall_read (/mount/a.bin)

The system call is a way in which a program running in user space (for example, an application) requests, from a kernel of an operating system, a service that needs higher permission for running. The system call provides an interface between a user program and the operating system. In this embodiment, the LibOS and the host OS have their own system calls, and the system calls function only in their own operating systems.

Step S153. The system call in the LibOS invokes a union file system in the LibOS to perform access.

For example, the following pseudocode may be used to invoke the union file system:

union_read (/mount/a.bin)

Step S154. The union file system determines whether a file to be accessed is in a readable/writable directory or is corresponding to a read-only directory in the host OS, and uses different processing methods for different cases, including the following steps.

Step S154A. If the file to be accessed is in a readable/writable directory, the union file system invokes a common file system in the LibOS to perform access.

For example, when a file /union/d.txt is to be accessed, because a readable/writable directory is managed based on the common file system in the LibOS, a corresponding interface in the common file system in the LibOS can be directly invoked to perform access.

Step S154B. If the file to be accessed is corresponding to a file in a read-only directory in the host OS, a customized file system is used to provide a service. In addition to a function of a common file system, the customized file system has a function of invoking a hypercall (hypercall) instruction to transfer an access request. The hypercall instruction may have different instructions when the hypercall instruction is based on different processors and is used to perform different functions. For example, for an x86 processor, in the case of entering, an exit event may be generated by invoking a vmcall instruction, in the case of exiting, an enter event may be generated by invoking vmlaunch.

In this embodiment, for example, the following pseudocode is used to invoke a vmcall instruction to transfer an access request:

vmcall (read, /mount/host/union/a.bin)

Step S155. Based on step S154B, after a vmcall instruction is invoked, a CPU generates an exit event of switching from a guest mode to a host mode, and the event is captured and processed by a hypervisor.

Step S156. When performing processing, the hypervisor invokes a system call that is in the host OS and that is used for accessing a file, to access a corresponding file in the host OS.

Herein, accessing using the system call is also corresponding to an access request. The access request is the second access request mentioned in the foregoing inventive content and S15. Then, the system call invokes a common file system and a series of other calls (such as a driver), to finally access data in underlying hardware (such as a hard disk and a flash memory).

Step S157. After access is completed, a result is returned in an original path, where a returning manner is corresponding to the invoking manner, for example, a value may be returned or a result may be returned to a specified place (such as a buffer).

It should be noted that for steps S155 and S156, the hypervisor may invoke a vmlaunch instruction to generate an enter event of switching from the host mode to the guest mode, and return a result.

Embodiment 2

Based on Embodiment 1, Embodiment 2 discloses another layer-based file access method of a virtualization instance. Different from the embodiment in which all directories (a read-only directory in a host OS and a readable/writable directory in a LibOS) are united in the LibOS, in this embodiment, read-only directories in the host OS is first united in the host OS, and then, union with the readable/writable directory in the LibOS is performed in the LibOS.

Figure 5:
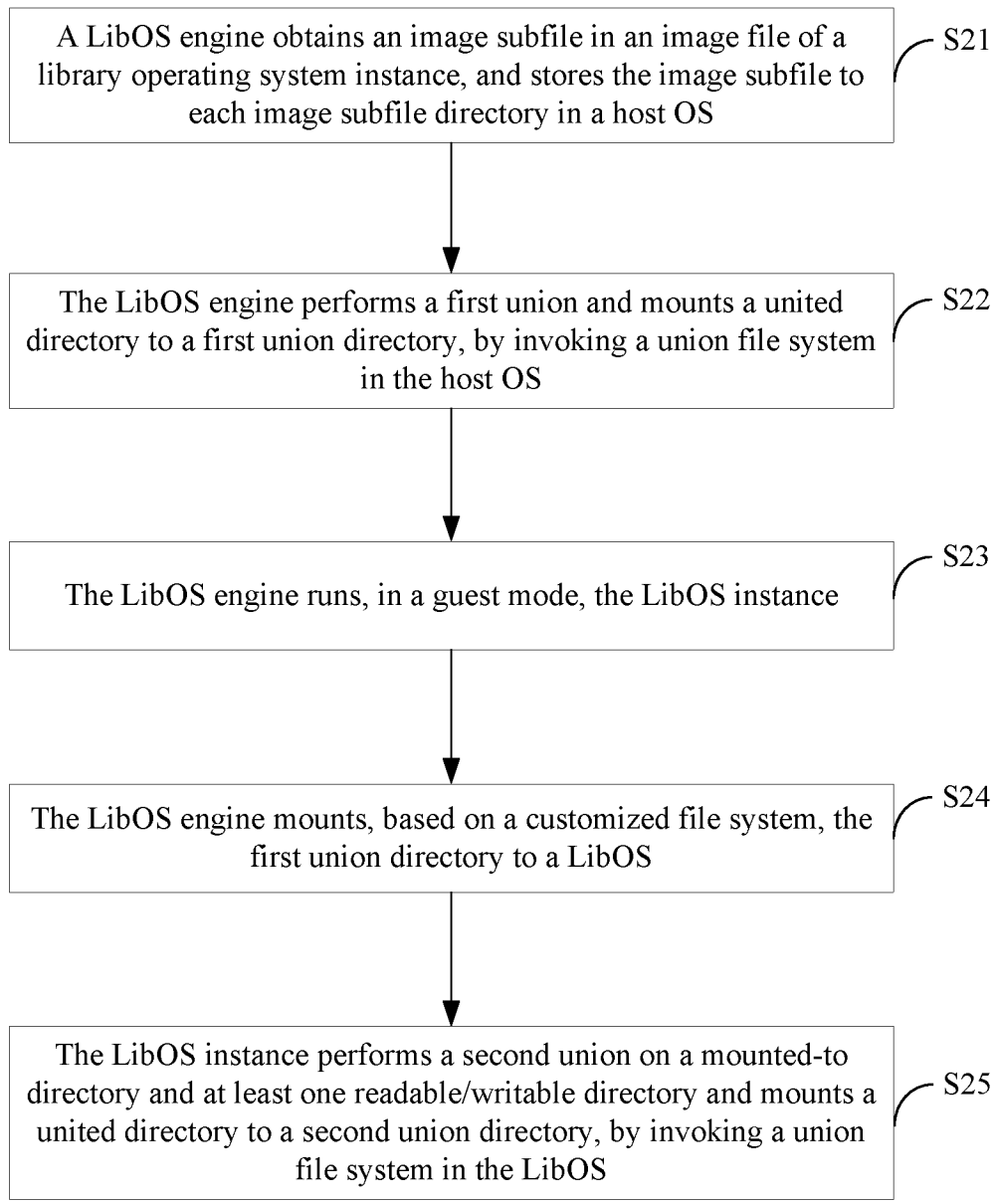
FIG. 5 is a flowchart according to Embodiment 2 of the present disclosure.
Figure 6:
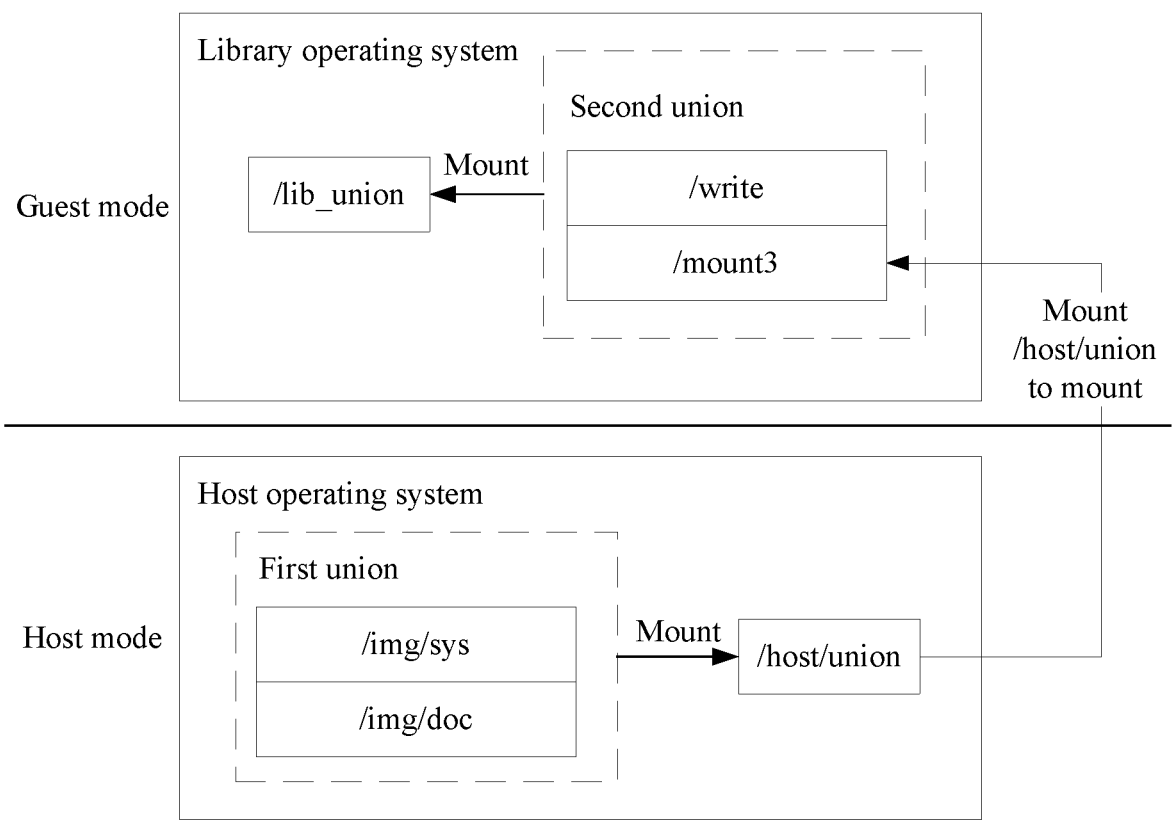
FIG. 6 is a schematic diagram of an example according to Embodiment 2 of the present disclosure.

The following describes this embodiment using steps. It should be noted that this embodiment is based on Embodiment 1, and therefore, some steps are the same as those in Embodiment 1 are not detailed in this embodiment, and a person skilled in the art can understand meanings of corresponding steps in this embodiment with reference to descriptions in Embodiment 1. Referring to the flowchart shown in FIG. 5, a schematic diagram of an example shown in FIG. 6, and a schematic diagram of accessing a file in a host OS by an application shown in FIG. 7, this embodiment may include the following steps.

Step S21. A LibOS engine obtains an image subfile in an image file of a library operating system instance, and stores the image subfile to each image subfile directory in a host OS.

Step S22. The LibOS engine performs a first union of the first time and mounts a united directory to a first union directory, by invoking a union file system in the host OS.

For example, still based on the example in Embodiment 1, a rule of the union of the first time is using a directory /img/sys as a first layer, and a directory /img/doc as a second layer, and a first union directory to which united directories are mounted is /host/union, and the directory /host/union includes the following files:

/host/union/a.bin
/host/union/b.so
/host/union/c.txt

Step S23. The LibOS engine runs, in a guest mode, a LibOS instance.

Similar to that in Embodiment 1, an order of this step and steps S21 and S22 is not limited, provided that this step is performed before S24.

Step S24. The LibOS engine mounts, based on a customized file system, the first union directory to a LibOS, for example, may mount a directory /host/union to a directory in the LibOS, for example, a directory /mount, or may mount a directory /host to a directory /mount in the LibOS.

A definition of the customized file system is the same as that in Embodiment 1, that is, the customized file system can invoke, based on a common file system, a hypercall instruction to generate an exit event of switching from the guest mode to a host mode.

In this step, an address of a mounted-to read-only directory may be converted such that in a LibOS instance, an application does not see an excessively long directory prefix. For example, an unconverted full file path that an application in a LibOS instance can "see" may include the following:

/mount/host/union/a.bin

The foregoing "see" is similar to "seeing" various files in a file manager (for example, "my computer" based on the Windows operating system). The essence is to provide a file management mechanism using some software modules (such as a file system), to provide some file access interfaces to applications such that the applications can obtain various types of information of a file (such as a file name, a file size, and a file type) using these access interfaces.

In this case, when starting programming, if an application developer needs to access a file such as a.bin, the application developer needs to access the file using a full path.

A converted-to file path that can be "seen" by an application may be as follows:

/mount/a.bin

That is, compared with a solution in which no conversion is performed, some path prefixes can be omitted, for example, the prefix /host/union in a full path is omitted in this example.

Step S25. The LibOS instance performs a second union of the second time on a mounted-to directory and at least one readable/writable directory and mounts a united directory to a second union directory, by invoking a union file system in the LibOS.

It is assumed that there is one readable/writable directory, /write, in the LibOS instance, and no file exists in the directory, and the second union directory is a directory /lib_union.

If a directory /host is mounted to a directory /mount in the LibOS and the union of the second time is performed on the mounted-to directory and the readable/writable directory /write, and a united directory is mounted to the directory /lib_union, the following files are obtained:

/lib_union/union/a.bin
/lib_union/union/b.so
/lib_union/union/c.txt

Alternatively, if a directory /host/union is mounted to a directory /mount in the LibOS and the union of the second time is performed on the mounted-to directory and the readable/writable directory /write, and a united directory is mounted to the directory /lib_union (for the example shown in FIG. 6), the following files are obtained:

/lib_union/a.bin
/lib_union/b.so
/lib_union/c.txt

Figure 7:
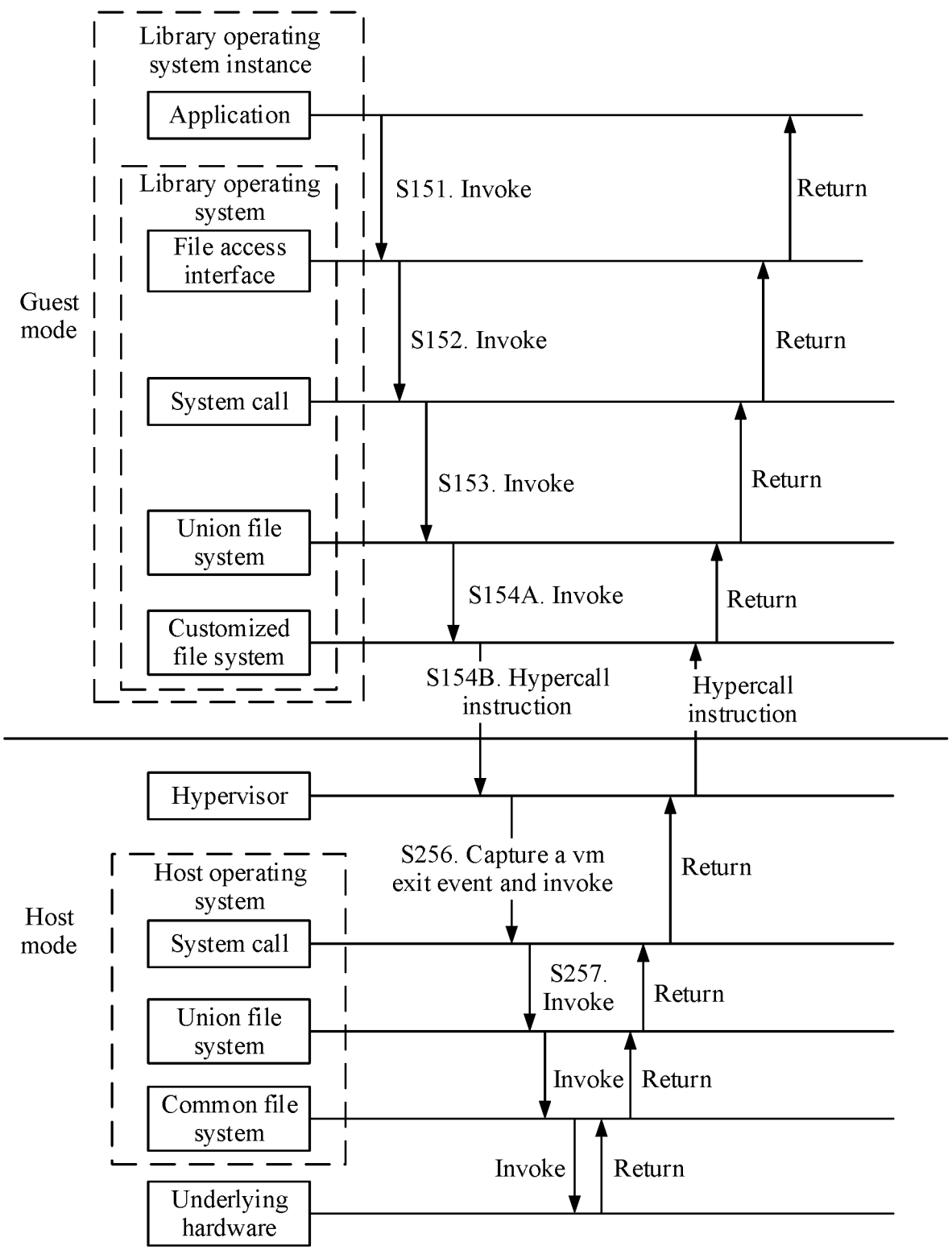
FIG. 7 is a schematic diagram of a file access method according to Embodiment 2 of the present disclosure.

Referring to FIG. 7, FIG. 7 is a schematic diagram of a method for accessing a file by an application in a LibOS instance in this embodiment. The method in this embodiment is similar to that in Embodiment 1. For example, if a file in a readable/writable directory needs to be accessed, the file may be accessed in the manner of steps S151 to S154 and S154A, if a file that needs to be accessed is corresponding to a file in a read-only directory in the host OS, steps S151 to S154, S154B, and S155 may be performed first, and then, the following steps are performed.

Step S256. When processing an exit event, a hypervisor invokes, in the host OS, a system call used for accessing a file.

Step S257. The system call invokes a union file system in the host OS to perform access. The union file system may access underlying hardware by invoking a common file system.

That is, in this embodiment, union in the host OS is performed, and therefore, step S257 needs to be performed to complete access.

Embodiment 3

Figure 8:
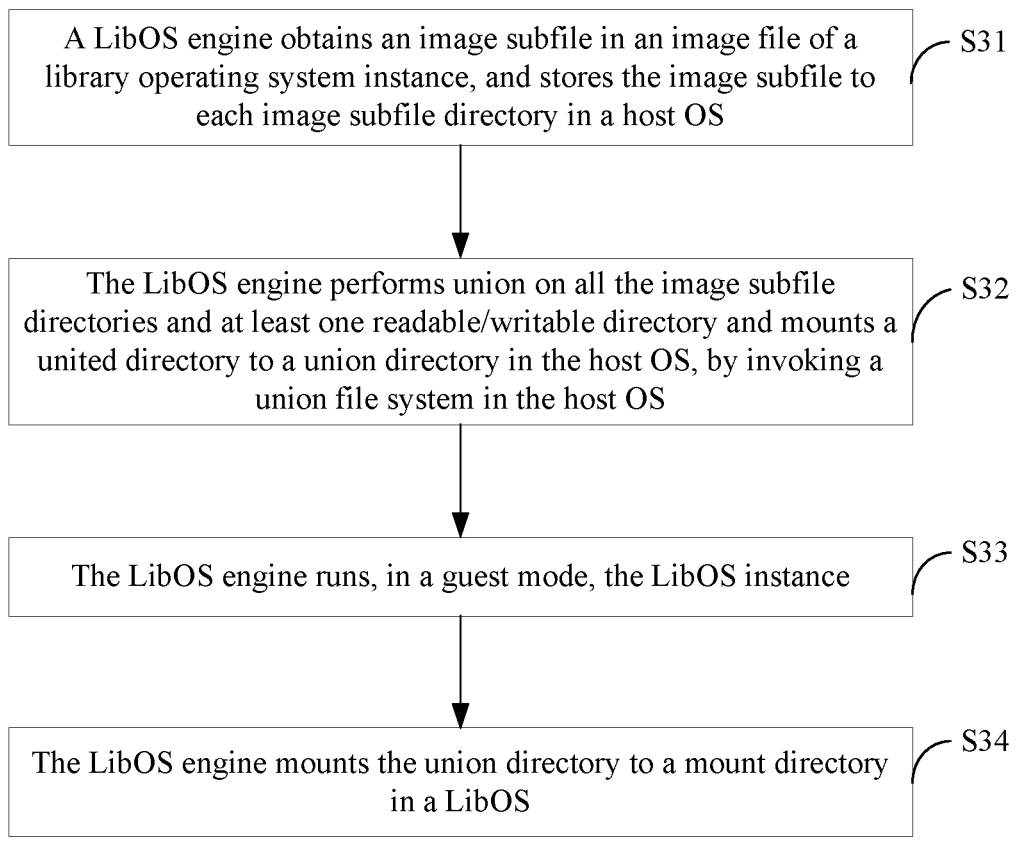
FIG. 8 is a flowchart according to Embodiment 3 of the present disclosure.
Figure 9:
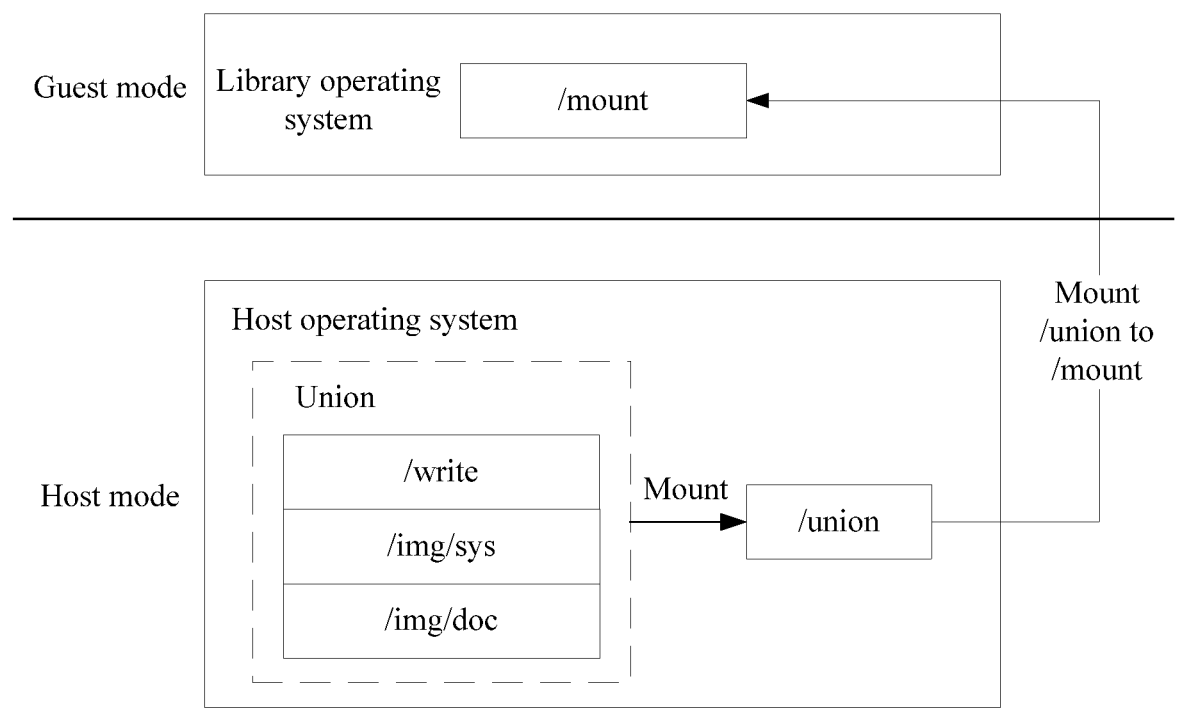
FIG. 9 is a schematic diagram of an example according to Embodiment 3 of the present disclosure.
Figure 10:
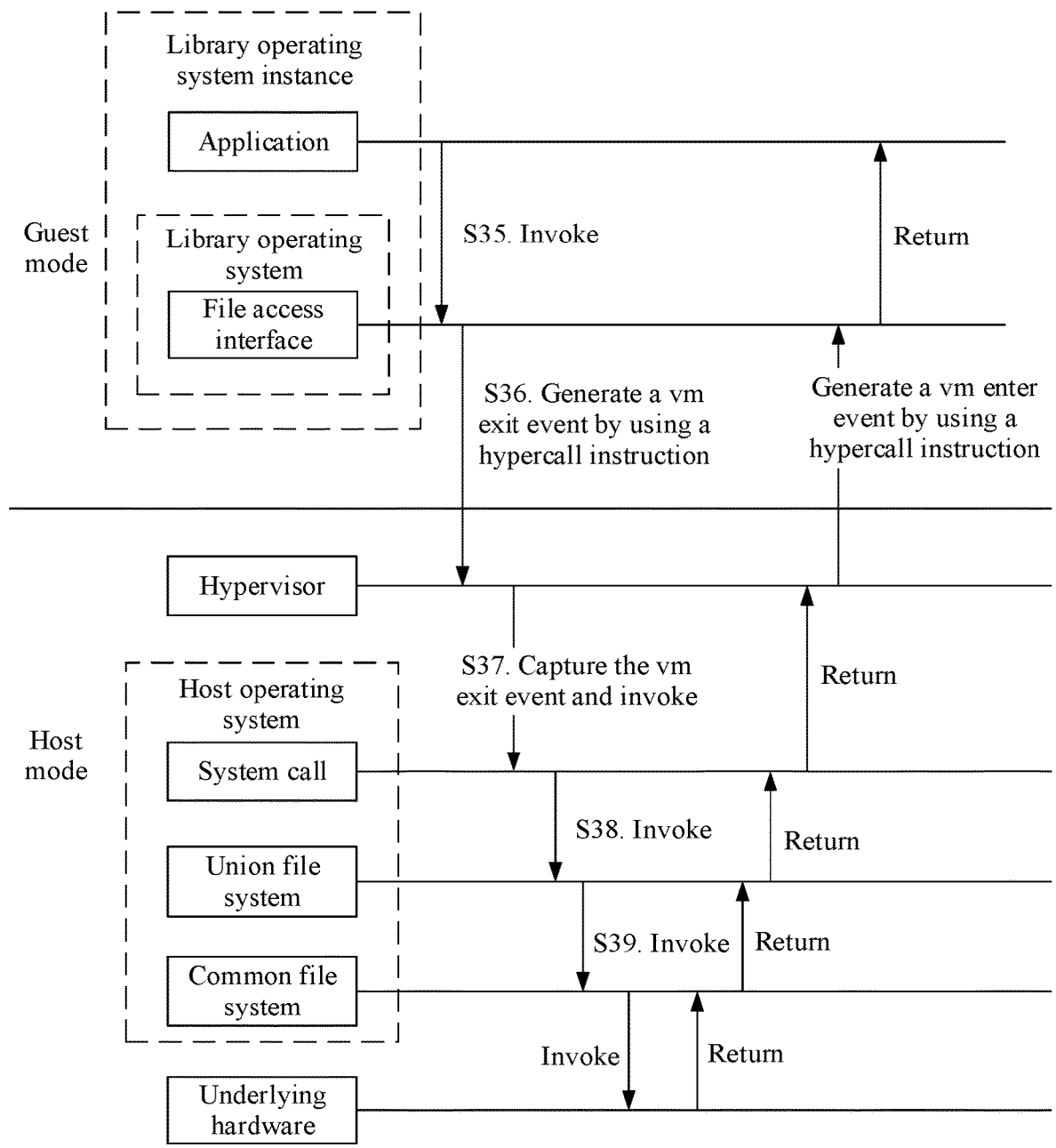
FIG. 10 is a schematic diagram of a file access method according to Embodiment 3 of the present disclosure.
Figure 11:
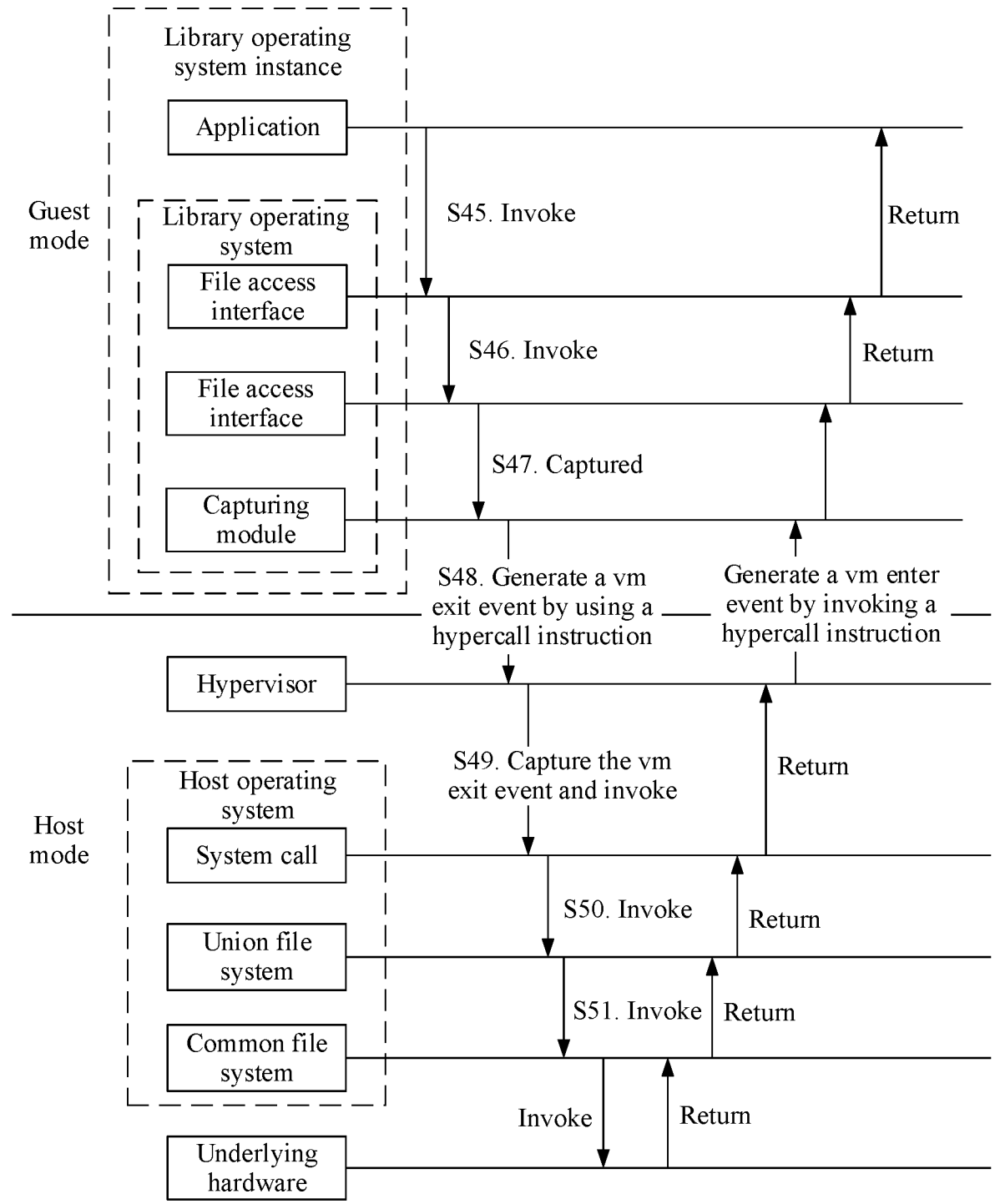
FIG. 11 is a schematic diagram of a file access method according to Embodiment 4 of the present disclosure.

Based on the foregoing embodiments, this embodiment of the present disclosure discloses another layer-based file access method of a virtualization instance. A flowchart shown in FIG. 8, a schematic diagram of a example shown in FIG. 9, and a schematic diagram of accessing a file in a host OS by an application shown in FIG. 10 are schematic flowcharts of this embodiment. Different from that a readable/writable directory is in a LibOS in the foregoing embodiment, in this embodiment, a readable/writable directory is in a host OS.

The following describes this embodiment using steps. Some steps are the same as those in the foregoing embodiments are not detailed in this embodiment, and a person skilled in the art can understand meanings of corresponding steps in this embodiment with reference to descriptions in Embodiment 1 and Embodiment 2.

This embodiment may include the following steps.

Step S31. A LibOS engine obtains an image subfile in an image file of a library operating system instance, and stores the image subfile to image subfile directories (/img/sys and /img/doc) in a host OS.

Step S32. The LibOS engine performs union on all the image subfile directories and at least one readable/writable directory (/write) and mounts a united directory to a union directory (/union) in the host OS, by invoking a union file system in the host OS.

Step S33. The LibOS engine runs, in a guest mode, a LibOS instance.

An order of this step and steps S32 and S31 is not limited, provided that this step is completed before step S34.

Step S34. The LibOS engine mounts the union directory to a mount directory (/mount) in a LibOS.

During mounting, an access property of the union file system for the image subfile directory is read-only, and an access property of the union file system for a readable/writable directory is readable/writable.

Referring to FIG. 10, the following describes how an application in the LibOS instance accesses content in the mount directory.

Step S35. An application invokes a file access interface to access content in the mount directory.

Step S36. The file access interface invokes a hypercall instruction to generate an exit event of switching from a guest mode to a host mode.

In this embodiment, the file access interface does not invoke a system call, but directly generates, based on the hypercall instruction, the exit event.

Step S37. A hypervisor captures the exit event and processes the event, to invoke a system call in the host OS.

Step S38. The system call in the host OS invokes a union file system in the host OS.

Step S39. The union file system invokes a common file system in the host OS.

Subsequently, the common file system finally accesses, using a series of calls, data stored in underlying hardware, and returns the data according to an original path. A returning method is based on a same principle described in the foregoing embodiments, and details are not described herein again.

Embodiment 4

Based on the foregoing embodiments, this embodiment of the present disclosure discloses another layer-based file access method of a virtualization instance. Referring to a schematic diagram of accessing a file in a host OS by an application shown in FIG. 13, the following steps are included.

When an application accesses content in a mounted-to directory, the following steps are included.

Step S45. An application invokes a file access interface to access content in a mount directory.

Step S46. The file access interface invokes a system call in a LibOS.

Compared with Embodiment 3, in this embodiment, the LibOS needs to configure a capturing module to capture the system call.

Step S47. A capturing module in the LibOS captures the system call.

Step S48. The capturing module invokes a hypercall instruction to generate an exit event.

Subsequent steps S49 to S51 are the same as steps S37 to S39 in Embodiment 3.

Embodiment 5

Figure 12:
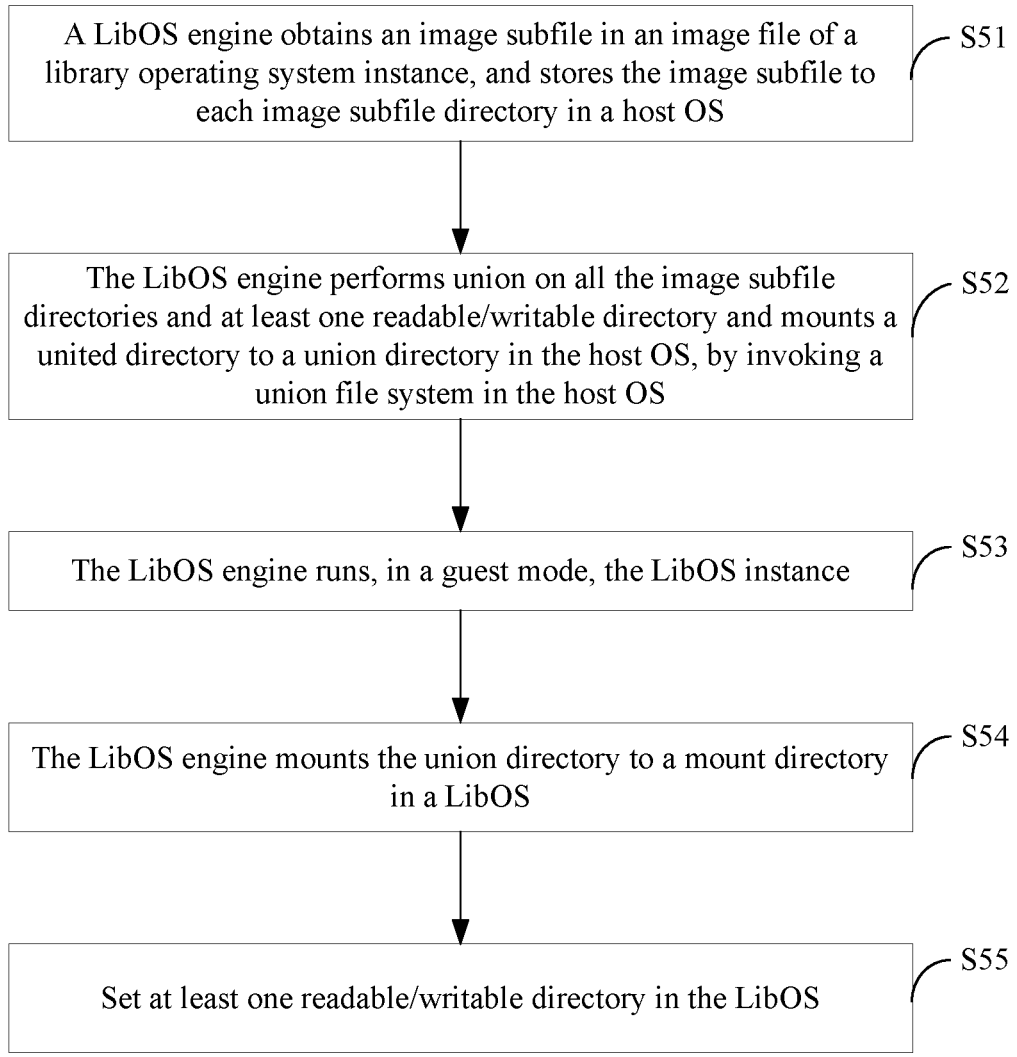
FIG. 12 is a flowchart according to Embodiment 5 of the present disclosure.
Figure 13:
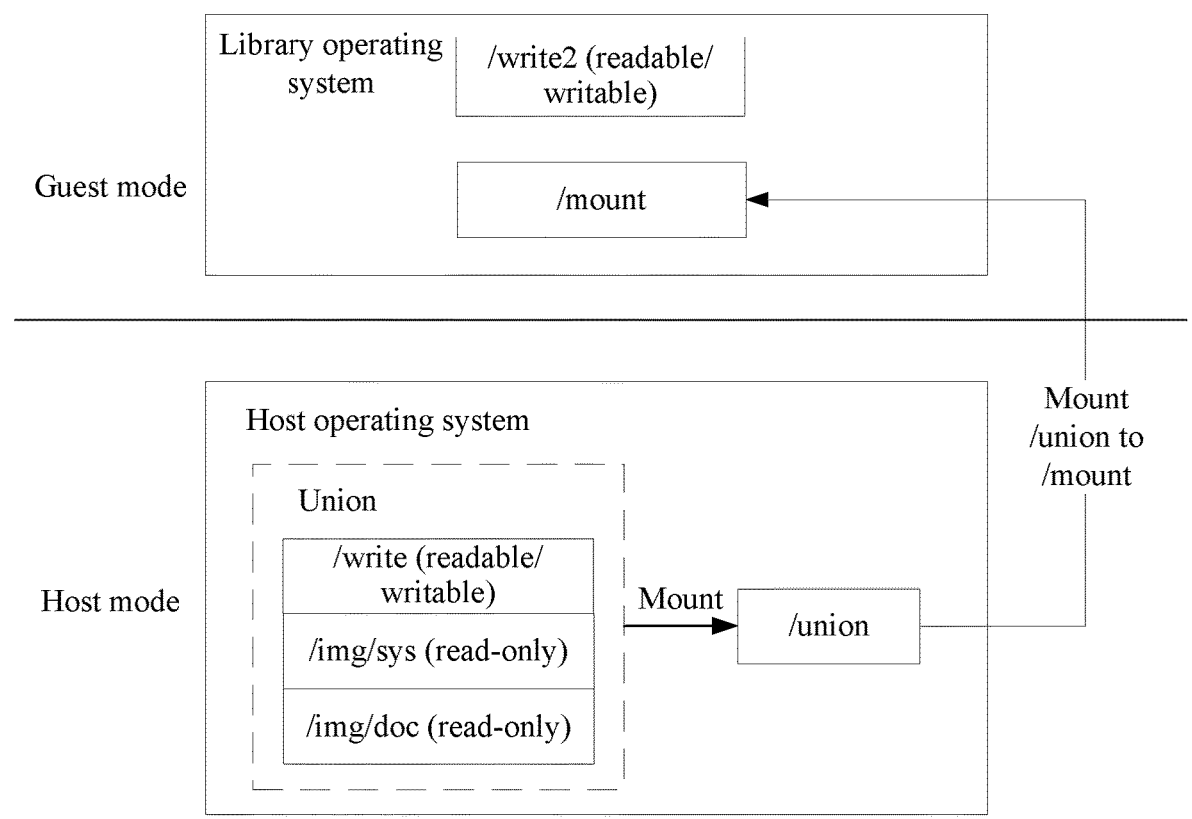
FIG. 13 is a schematic diagram of an example according to Embodiment 5 of the present disclosure.

Based on the foregoing embodiments, this embodiment of the present disclosure discloses another layer-based file access method of a virtualization instance. A flowchart shown in FIG. 12 and a schematic diagram of an example shown in FIG. 13 are schematic flowcharts of this embodiment. This embodiment is mainly based on Embodiment 3 and Embodiment 4. In this embodiment, a readable/writable directory may be further set in a LibOS, for an application in a LibOS instance to use.

The following steps may be included.

Steps S51 to S54 are corresponding to steps S31 to S34, respectively.

Step S55. Set at least one readable/writable directory (/write2) in a LibOS.

In this embodiment, in addition to a readable/writable directory that is set in a host OS, a readable/writable directory (/write2) is set in the LibOS. Union is performed on the readable/writable directory in the host OS and an image subfile directory, while union is not performed on the readable/writable directory in the LibOS and the image subfile directory. The readable/writable directory in the LibOS may be used to store some data that does not need to be united and that are used by the application. The directory may be managed based on a common file system in the LibOS.

In an access procedure, a directory may be accessed based on the common file system in the LibOS. If a mount directory in the LibOS, to which mounting is performed after union in the host OS, is accessed, the methods in Embodiment 3 and Embodiment 4 can be used, and details are not described herein again.

Embodiment 6

Figure 14:
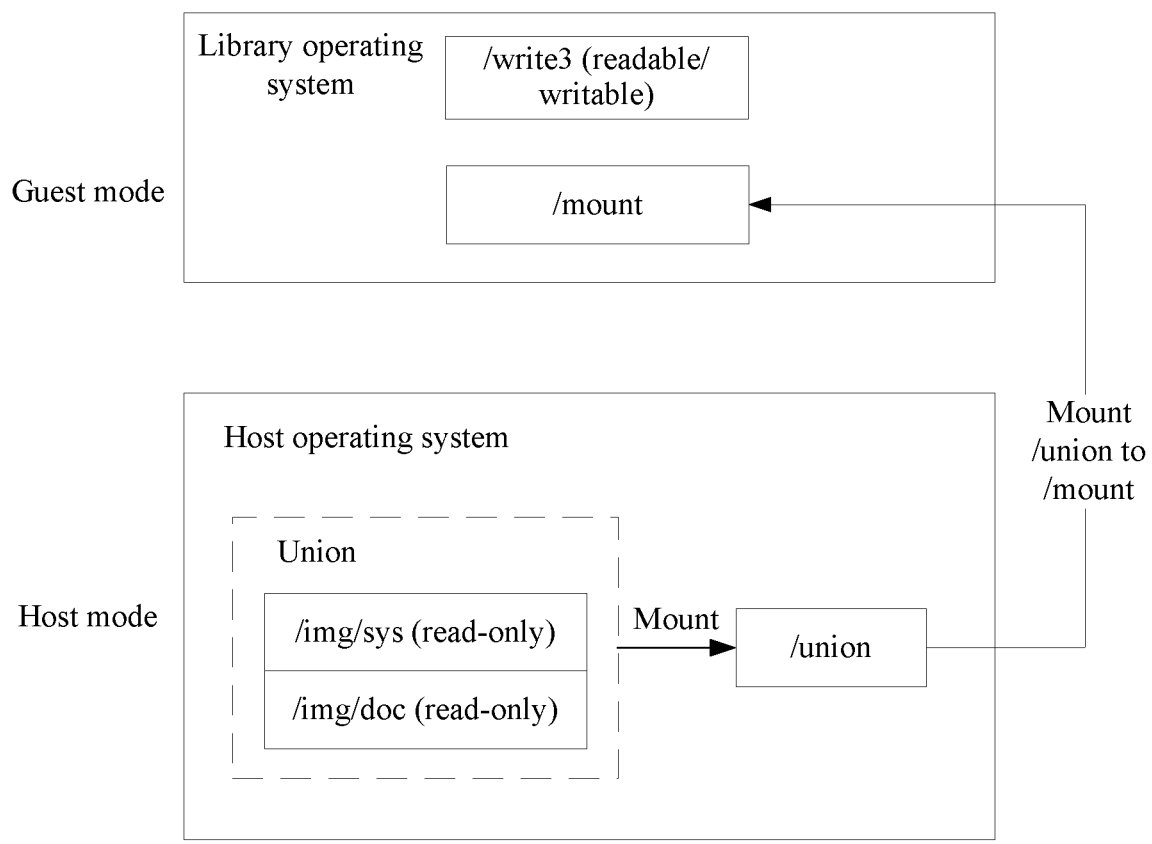
FIG. 14 is a schematic diagram of an example according to Embodiment 6 of the present disclosure.

Based on the foregoing embodiments, this embodiment of the present disclosure discloses another layer-based file access method of a virtualization instance. Referring to FIG. 14, FIG. 14 is a schematic diagram of an example of this embodiment. In this embodiment, when union is performed in a host OS, union is performed only on an image subfile directory, and then a united directory is mounted to a LibOS, but union with at least one readable/writable directory is not performed. In addition, similar to that in Embodiment 5, a readable/writable directory (/write3) is set in the LibOS.

An application accesses the readable/writable directory (/write3) using a common file system in the LibOS, similar to the method in Embodiment 5.

An application may read-access a file in a mounted-to directory (corresponding to a file in a union directory in the host OS) using the methods in Embodiment 3 and Embodiment 4.

If the file in the mounted-to directory needs to be modified, the corresponding file may be read using the methods in Embodiment 3 and Embodiment 4, copied to a readable/writable directory in the LibOS, and then modified. Subsequently, the file may be accessed based on a file in the readable/writable directory in the LibOS. In the foregoing embodiments, a union file system performs union on at least one readable/writable directory and an image subfile directory, and therefore, the union file system can help to complete this step. However, in this embodiment, no union file system is used, and therefore, an image subfile needs to be modified using the method described in this step.

Embodiment 7

Figure 15:
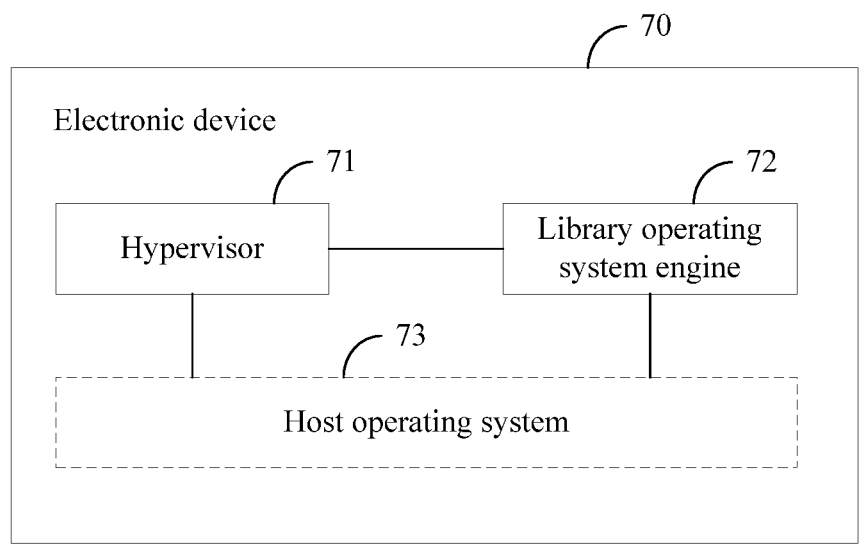
FIG. 15 is a schematic structural diagram of an electronic device according to Embodiment 7 of the present disclosure.

Referring to FIG. 15, based on all of the foregoing embodiments, this embodiment of the present disclosure discloses an electronic device 70, including a hypervisor (Hypervisor) 71 and a library operating system engine (LibOS Engine) 72. The hypervisor and the LibOS engine run on a host OS (Host OS), and the hypervisor, the LibOS engine, and the host OS run in a host mode. The library operating system engine may run a library operating system instance.

In another embodiment, an electronic device 70 may include a hypervisor 71, a library operating system engine 72, and a host OS 73.

Each of the modules may run in a form of software. For a function and a method procedure, refer to descriptions in the foregoing embodiments.

Figure 16:
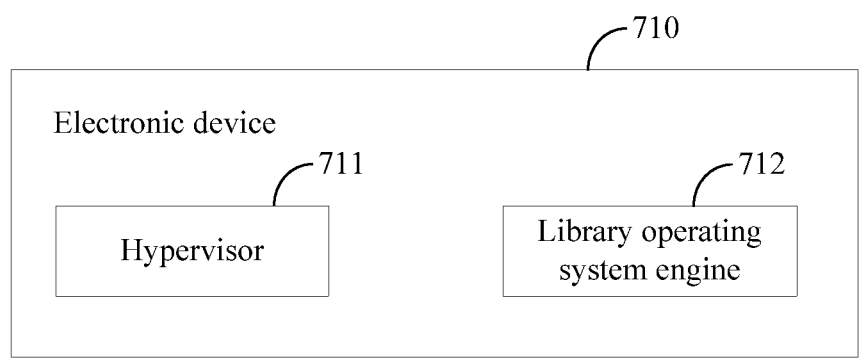
FIG. 16 is a schematic structural diagram of another electronic device according to Embodiment 7 of the present disclosure.

Referring to FIG. 16, in another embodiment, an electronic device 710 includes a hypervisor 711 and a library operating system engine 712. For functions of the modules, refer to descriptions in the foregoing embodiments.

Embodiment 8

Figure 17:
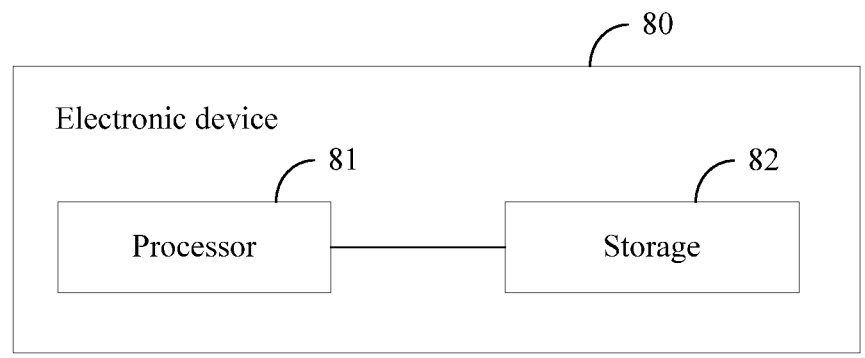
FIG. 17 is a schematic structural diagram of an electronic device according to Embodiment 8 of the present disclosure.

Referring to FIG. 17, based on all of the foregoing embodiments, this embodiment of the present disclosure discloses an electronic device 80, including a processor 81 and a storage 82. The storage is configured to store code required for execution by a hypervisor and a library operating system engine. The processor is configured to perform a corresponding operation according to the code. The storage may be a nonvolatile memory (such as a hard disk or a disk) or a memory. Usually, the nonvolatile memory is configured to store a file that needs to be retained such as a boot file. The memory is configured to store running process data.

In another embodiment, the storage is configured to store code required for performing steps in the foregoing embodiments by a hypervisor, a library operating system engine, and a host OS. The processor is configured to perform a corresponding operation according to the code.

In another embodiment, the storage is configured to store code for related modules in the electronic device shown in FIG. 16 or FIG. 17.

The electronic device may be a device used in various fields such as a device in the communications field or a device in the computing field, and may be a terminal, a server, a router, a switch, or the like.

Embodiment 9

Figure 18:
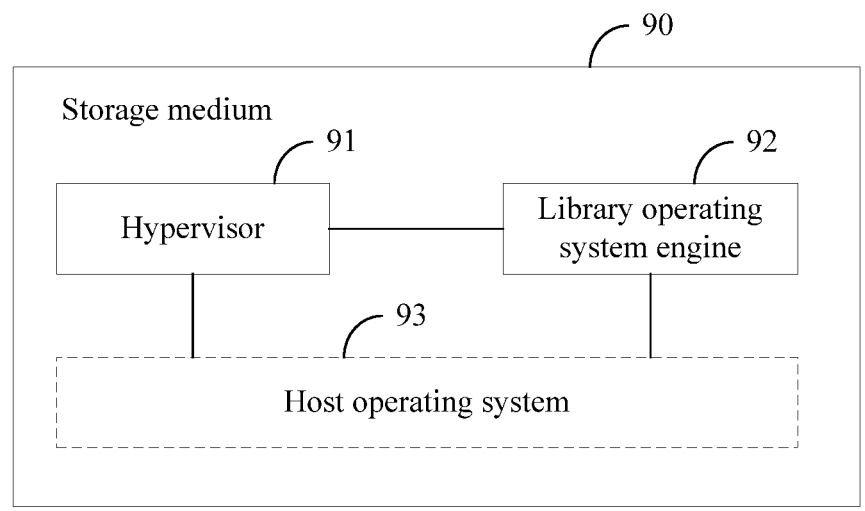
FIG. 18 is a schematic diagram of storage medium content according to Embodiment 9 of the present disclosure.

Referring to FIG. 18, based on the foregoing embodiments, this embodiment discloses a storage medium 90. The storage medium stores code for performing the foregoing embodiments by a processor. In this embodiment, the storage medium may store code required for running a hypervisor 91 and a library operating system engine 92. Alternatively, in this embodiment, the storage medium may store code required for running a hypervisor 91, a library operating system engine 92, and a host OS 93.

In another embodiment, the storage medium is configured to store code for related modules in the electronic device shown in FIG. 16 or FIG. 17.

The storage medium in this embodiment may be a non-volatile storage medium such as a magnetic disk, an optical disc, or a hard disk.

Examples of embodiments are provided above to further describe the objective, technical solutions, and advantages of this application in detail. It should be understood that the foregoing is merely examples of embodiments of this application, but is not intended to limit this application. Any modification, equivalent replacement, and improvement made without departing from the spirit and principle of the present disclosure shall fall within the protection scope of this application.

What is claimed is:

1. A file access method implemented by a host operating system, wherein a hypervisor and a library operating system engine run on the host operating system, wherein the host operating system, the hypervisor, and the library operating system engine run in a host mode, and wherein the method comprises:
 obtaining, by the library operating system engine, an image file of a library operating system instance based on a library operating system, wherein the image file comprises a plurality of image subfiles, and the plurality of image subfiles are specified as one or more image layers;
 storing the plurality of image subfiles to a plurality of image subfile directories in the host operating system based on the one or more image layers specified by the plurality of image subfiles, wherein the plurality of image subfile directories are in a one-to-one correspondence to the one or more image layers;
 performing a first union on the plurality of image subfile directories;
 mounting a united directory to a first union directory using a union file system, wherein the first union directory comprises at least one union directory file, and wherein one or more union layers formed by the at least one union directory file are in a one-to-one correspondence to the one or more image layers;
 running, by the library operating system engine, the library operating system instance in a guest mode based on one or more of the plurality of image subfiles;
 generating, by the hypervisor, an exit event of switching from the guest mode to the host mode in response to the library operating system receiving a first access request to access the union directory file;
 capturing, by the hypervisor, the exit event;
 converting, by the hypervisor, the first access request into a second access request that can be used to access an image subfile corresponding to the union directory file; and
 accessing, by the hypervisor, the image subfile corresponding to the union directory file based on the second access request.

2. The method according to claim 1, wherein the first union directory is in the library operating system, and wherein performing the first union on the plurality of image subfile directories and mounting the united directory to the first union directory using the union file system comprises:
 mounting, by the library operating system engine, the plurality of image subfile directories to one or more mount directories in the library operating system; and
 performing, by the library operating system, the first union on the one or more mount directories and at least one common file system-based directory in the library operating system; and
 mounting the united directory to the first union directory using the union file system contained in the library operating system, wherein the at least one common file system-based directory is readable or writable.

3. The method according to claim 2, further comprising accessing the file in the at least one common file system-based directory in response to receiving a third access request to access a file in the at least one common file system-based directory.

4. The method according to claim 1, wherein the first union directory is in the library operating system, and wherein performing the first union on the plurality of image subfile directories and mounting the united directory to the first union directory using the union file system comprises:
 mounting, by the library operating system engine, the plurality of image subfile directories to one or more mount directories in the library operating system; and
 performing, by the library operating system, the first union on the one or more mount directories; and
 mounting the united directory to the first union directory using the union file system contained in the library operating system.

5. The method according to claim 1, wherein the first union directory is in the host operating system, and wherein performing the first union on the plurality of image subfile directories and mounting the united directory to the first union directory using the union file system comprises:
 performing, by the library operating system engine, the first union on the plurality of image subfile directories; and
 mounting the united directory to the first union directory by invoking the union file system in the host operating system.

6. The method according to claim 5, further comprising:
 mounting, by the library operating system engine, the first union directory to a mount directory in the library operating system instance;
 performing, by the library operating system, a second union on the mount directory and at least one directory in the library operating system; and
 mounting the united directory to a second union directory by invoking the union file system contained in the library operating system, wherein the at least one directory is readable or writable.

7. The method according to claim 1, wherein generating the exit event comprises invoking a customized file system in the library operating system to access the union directory file and generate the exit event, wherein the customized file system is a file system that is capable of generating the exit event according to the first access request.

8. The method according to claim 1, wherein the first union directory is in the host operating system, and wherein performing the first union on the plurality of image subfile directories and mounting the united directory to the first union directory using the union file system comprises:
 performing, by the library operating system engine, the first union on the plurality of image subfile directories and at least one directory in the host operating system; and
 mounting the united directory to the first union directory using the union file system in the host operating system, wherein the at least one directory is readable or writable, and wherein the method further comprises:
mounting, by the library operating system engine, the first union directory to a mount directory in the library operating system; and
correspondingly accessing the union directory file through the mount directory in response to the application in the library operating system instance requesting to access the union directory file.

9. The method according to claim 1, wherein the image subfile directory is read-only in the first union directory.

10. The method according to claim 1, wherein the exit event is generated in response to invoking a hypercall instruction or is constructing an exception.

11. An electronic device implementing a host operating system, comprising:
a processor; and
a storage, wherein the processor is configured to read and execute code stored in the storage, wherein code stored in the storage comprises a plurality of instructions configured to execute a hypervisor and a library operating system engine in a host mode, wherein the plurality of instructions that, when executed by the processor, caused the processor to:
obtain an image file of a library operating system instance based on a library operating system, wherein the image file comprises a plurality of image subfiles, and the plurality of image subfiles are specified as one or more image layers;
store the plurality of image subfiles to a plurality of image subfile directories in the host operating system based on the one or more image layers specified by the plurality of image subfiles, wherein the plurality of image subfile directories are in a one-to-one correspondence to the one or more image layers;
perform a first union on the plurality of image subfile directories;
mount a united directory to a first union directory using a union file system, wherein the first union directory comprises at least one union directory file, and wherein one or more union layers formed by the at least one union directory file are in a one-to-one correspondence to the one or more image layers;
run, the library operating system instance in a guest mode based on one or more of the plurality of image subfiles; and
generate exit event of switching from the guest mode to the host mode in response to the library operating system receiving a first access request to access the union directory file;
capture the exit event;
convert the first access request into a second access request that can be used to access an image subfile corresponding to the union directory file; and
access the image subfile corresponding to the union directory file based on the second access request.

12. The electronic device according to claim 11, wherein the first union directory is in the library operating system, and wherein the plurality of instruction, when executed by the processor, further cause the processor to:
mount the plurality of image subfile directories to one or more mount directories in the library operating system; and
perform the first union on the one or more mount directories and at least one common file system-based directory in the library operating system; and
mount the united directory to the first union directory using the union file system contained in the library operating system, wherein the at least one common file system-based directory is readable or writable.

13. The electronic device according to claim 12, wherein the plurality of instructions, when executed by the processor, further cause the processor to access the file in the at least one common file system-based directory in response to receiving a third access request to access a file in the at least one common file system-based directory.

14. The electronic device according to claim 11, wherein the first union directory is in the library operating system, and wherein the plurality of instructions, when executed by the processor, further cause the processor to:
mount the plurality of image subfile directories to one or more mount directories in the library operating system; and
perform the first union on the one or more mount directories; and
mount the united directory to the first union directory using the union file system contained in the library operating system.

15. The electronic device according to claim 11, wherein the first union directory is in the host operating system, and wherein the plurality of instructions, when executed by the processor, further cause the processor to:
perform the first union on the plurality of image subfile directories; and
mount the united directory to the first union directory by invoking the union file system in the host operating system.

16. The electronic device according to claim 15, wherein the plurality of instructions, when executed by the processor, further cause the processor to:
mount the first union directory to a mount directory in the library operating system instance;
perform a second union on the mount directory and at least one directory in the library operating system; and
mount the united directory to a second union directory by invoking the union file system contained in the library operating system, wherein the at least one directory is readable or writable.

17. The electronic device according to claim 11, wherein the plurality of instructions, when executed by the processor, further cause the processor to invoke a customized file system in the library operating system to access the union directory file and generate the exit event, wherein the customized file system is a file system that is capable of generating the exit event according to the first access request.

18. The electronic device according to claim 11, wherein the first union directory is in the host operating system, and wherein the plurality of instructions, when executed by the processor, further cause the processor to:
perform the first union on the plurality of image subfile directories and at least one directory in the host operating system; and
mount the united directory to the first union directory using the union file system in the host operating system, wherein the at least one directory is readable or writable;
mount the first union directory to a mount directory in the library operating system; and
correspondingly access the union directory file through the mount directory in response to the application in the library operating system instance requesting to access the union directory file.

* * * * *

UNITED STATES PATENT AND TRADEMARK OFFICE
CERTIFICATE OF CORRECTION

PATENT NO. : 11,010,355 B2
APPLICATION NO. : 16/371503
DATED : May 18, 2021
INVENTOR(S) : Lei Ye, Qixuan Wu and Lei Dai Page 1 of 1

It is certified that error appears in the above-identified patent and that said Letters Patent is hereby corrected as shown below:

In the Claims

Claim 12, Column 23, Line 58: "plurality of instruction, when" should read "plurality of instructions, when"

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*